(12) United States Patent
Galitsky

(10) Patent No.: US 11,455,494 B2
(45) Date of Patent: Sep. 27, 2022

(54) AUTOMATED BUILDING OF EXPANDED DATASETS FOR TRAINING OF AUTONOMOUS AGENTS

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 685 days.

(21) Appl. No.: 16/426,878

(22) Filed: May 30, 2019

(65) Prior Publication Data

US 2019/0370604 A1    Dec. 5, 2019

Related U.S. Application Data

(60) Provisional application No. 62/678,111, filed on May 30, 2018.

(51) Int. Cl.
| | | |
|---|---|---|
| *G06K 9/62* | (2022.01) | |
| *G06F 40/35* | (2020.01) | |
| *G06N 20/00* | (2019.01) | |

(52) U.S. Cl.
CPC .......... *G06K 9/6257* (2013.01); *G06F 40/35* (2020.01); *G06K 9/6201* (2013.01); (Continued)

(58) Field of Classification Search
CPC .. G06K 9/6257; G06K 9/6201; G06K 9/6219; G06K 9/6282; G06F 40/35; G06F 40/216; G06F 40/56; G06N 20/00; G06N 3/006; G06N 5/041; G06N 20/10; G06N 5/003; G06N 5/022; G06N 5/043; G06N 20/20

See application file for complete search history.

(56) References Cited

U.S. PATENT DOCUMENTS

| | | |
|---|---|---|
| 5,495,605 A | 2/1996 | Cadot |
| 6,112,168 A | 8/2000 | Corston et al. |

(Continued)

FOREIGN PATENT DOCUMENTS

WO    2015089822    6/2015

OTHER PUBLICATIONS

Galitsky "Discovering Rhetorical Agreement between a Request and Response" Dec. 2017 https://pdfs.semanticscholar.org/3142/51e49fd68eefd5739c738499f31a2c63cfa9.pdf?_ga=2.108848066.1902050639.1650549073-2010656501.1650549073 (Year: 2017).*

(Continued)

*Primary Examiner* — Yogeshkumar Patel
(74) *Attorney, Agent, or Firm* — Kilpatrick Townsend & Stockton LLP

(57) ABSTRACT

Improved systems and methods for generating training data for classification models are disclosed. In an example, a training application accesses two fragments of text. The application represents each fragment of text as a parse thicket. The parse thickets jointly represent syntactic and discourse information. From the parse thickets, the application generalizes the text by identifying common entities or common rhetorical relations between parse thickets. The generalized text is added to a training data set, thereby increasing the coverage of the training set.

20 Claims, 23 Drawing Sheets

(52) U.S. Cl.
CPC ......... *G06K 9/6219* (2013.01); *G06K 9/6282* (2013.01); *G06N 20/00* (2019.01)

(56) References Cited

U.S. PATENT DOCUMENTS

| | | | |
|---|---|---|---|
| 6,181,909 | B1 | 1/2001 | Burstein et al. |
| 6,675,159 | B1* | 1/2004 | Lin .................. G06F 16/353 |
| 6,731,307 | B1 | 5/2004 | Strubbe et al. |
| 7,152,031 | B1 | 12/2006 | Jensen et al. |
| 7,359,860 | B1 | 4/2008 | Miller et al. |
| 7,519,529 | B1 | 4/2009 | Horvitz |
| 7,551,552 | B2 | 6/2009 | Dunagan et al. |
| 7,840,556 | B1 | 11/2010 | Dayal et al. |
| 9,037,464 | B1 | 5/2015 | Mikolov et al. |
| 9,292,490 | B2 | 3/2016 | Kimelfeld et al. |
| 9,449,080 | B1 | 9/2016 | Zhang |
| 9,559,993 | B2 | 1/2017 | Palakovich et al. |
| 9,582,501 | B1 | 2/2017 | Salmon et al. |
| 9,817,721 | B1 | 11/2017 | Youngworth |
| 10,019,716 | B1 | 7/2018 | Ainslie et al. |
| 10,175,865 | B2 | 1/2019 | Beaver et al. |
| 10,289,974 | B1 | 5/2019 | Ouimette |
| 10,545,648 | B2 | 1/2020 | Beaver et al. |
| 10,599,885 | B2 | 3/2020 | Galitsky |
| 10,679,011 | B2 | 6/2020 | Galitsky |
| 10,796,099 | B2 | 10/2020 | Galitsky et al. |
| 10,796,102 | B2 | 10/2020 | Galitsky |
| 10,817,670 | B2 | 10/2020 | Galitsky |
| 10,853,581 | B2 | 12/2020 | Galitsky |
| 11,023,684 | B1 | 6/2021 | Flor et al. |
| 11,100,144 | B2 | 8/2021 | Galitsky |
| 11,373,632 | B2 | 6/2022 | Galitsky |
| 11,386,274 | B2 | 7/2022 | Galitsky |
| 2001/0007987 | A1 | 7/2001 | Igata |
| 2001/0053968 | A1 | 12/2001 | Galitsky et al. |
| 2002/0040292 | A1 | 4/2002 | Marcu |
| 2002/0046018 | A1 | 4/2002 | Marcu et al. |
| 2003/0138758 | A1 | 7/2003 | Burstein et al. |
| 2004/0044519 | A1 | 3/2004 | Polanyi et al. |
| 2004/0148170 | A1 | 7/2004 | Acero et al. |
| 2005/0086592 | A1 | 4/2005 | Polanyi et al. |
| 2005/0108001 | A1* | 5/2005 | Aarskog ............... G06F 40/253 704/10 |
| 2007/0073533 | A1 | 3/2007 | Thione et al. |
| 2007/0136284 | A1 | 6/2007 | Cobb et al. |
| 2007/0192306 | A1 | 8/2007 | Papakonstantinou et al. |
| 2007/0294229 | A1 | 12/2007 | Au |
| 2008/0172409 | A1 | 7/2008 | Botros et al. |
| 2008/0228467 | A1 | 9/2008 | Womack et al. |
| 2009/0089252 | A1 | 4/2009 | Galitsky et al. |
| 2009/0100053 | A1 | 4/2009 | Boschee et al. |
| 2009/0248399 | A1 | 10/2009 | Au |
| 2009/0282019 | A1 | 11/2009 | Galitsky et al. |
| 2010/0169359 | A1 | 7/2010 | Barrett et al. |
| 2011/0119049 | A1 | 5/2011 | Ylonen |
| 2011/0153673 | A1 | 6/2011 | Boschee et al. |
| 2012/0041950 | A1 | 2/2012 | Koll et al. |
| 2012/0078902 | A1 | 3/2012 | Duboue et al. |
| 2012/0246578 | A1 | 9/2012 | Baldwin et al. |
| 2013/0046757 | A1 | 2/2013 | Salvetti et al. |
| 2013/0151347 | A1 | 6/2013 | Baldwin et al. |
| 2013/0204611 | A1 | 8/2013 | Tsuchida et al. |
| 2014/0040288 | A1 | 2/2014 | Galitsky |
| 2014/0122083 | A1 | 5/2014 | Xiaojiang |
| 2014/0136188 | A1 | 5/2014 | Wroczynski et al. |
| 2015/0039295 | A1 | 2/2015 | Soschen |
| 2015/0046492 | A1 | 2/2015 | Balachandran |
| 2015/0051900 | A1 | 2/2015 | Kimelfeld et al. |
| 2015/0134325 | A1 | 5/2015 | Skiba et al. |
| 2015/0149461 | A1 | 5/2015 | Aguilar Lemarroy et al. |
| 2015/0161512 | A1 | 6/2015 | Byron et al. |
| 2016/0034457 | A1 | 2/2016 | Bradley et al. |
| 2016/0055240 | A1 | 2/2016 | Tur et al. |
| 2016/0071517 | A1 | 3/2016 | Beaver et al. |
| 2016/0085743 | A1 | 3/2016 | Haley |
| 2016/0086601 | A1 | 3/2016 | Chotimongkol et al. |
| 2016/0099892 | A1 | 4/2016 | Palakovich et al. |
| 2016/0232152 | A1 | 8/2016 | Mahamood |
| 2016/0245779 | A1 | 8/2016 | Khalaj Amineh et al. |
| 2016/0246779 | A1 | 8/2016 | Ho et al. |
| 2016/0247068 | A1 | 8/2016 | Lin |
| 2016/0283491 | A1 | 9/2016 | Lu et al. |
| 2016/0328667 | A1 | 11/2016 | Macciola et al. |
| 2017/0032053 | A1 | 2/2017 | LeTourneau |
| 2017/0104829 | A1 | 4/2017 | Degroat |
| 2017/0116982 | A1 | 4/2017 | Gelfenbeyn et al. |
| 2017/0177675 | A1 | 6/2017 | Beller et al. |
| 2017/0228368 | A1 | 8/2017 | Carter et al. |
| 2017/0277993 | A1 | 9/2017 | Beaver et al. |
| 2017/0286390 | A1 | 10/2017 | Yashpe et al. |
| 2018/0121062 | A1 | 5/2018 | Beaver et al. |
| 2018/0181648 | A1 | 6/2018 | Chen |
| 2018/0189385 | A1 | 7/2018 | Sun et al. |
| 2018/0260472 | A1 | 9/2018 | Kelsey et al. |
| 2018/0314689 | A1 | 11/2018 | Wang et al. |
| 2018/0365228 | A1 | 12/2018 | Galitsky |
| 2018/0365593 | A1 | 12/2018 | Galitsky |
| 2018/0373701 | A1 | 12/2018 | McAteer et al. |
| 2019/0005027 | A1 | 1/2019 | He et al. |
| 2019/0033957 | A1 | 1/2019 | Shionozaki |
| 2019/0057157 | A1 | 2/2019 | Mandal et al. |
| 2019/0103111 | A1 | 4/2019 | Tiwari et al. |
| 2019/0138190 | A1 | 5/2019 | Beaver et al. |
| 2019/0163756 | A1 | 5/2019 | Bull et al. |
| 2019/0354544 | A1 | 11/2019 | Hertz et al. |
| 2019/0371299 | A1 | 12/2019 | Jiang et al. |
| 2019/0377605 | A1 | 12/2019 | Joseph |
| 2020/0099790 | A1 | 3/2020 | Ma et al. |
| 2020/0117858 | A1 | 4/2020 | Freeman et al. |
| 2020/0301589 | A1 | 9/2020 | Buzzard et al. |
| 2021/0020165 | A1 | 1/2021 | Scodary et al. |
| 2021/0027799 | A1 | 1/2021 | Scodary et al. |
| 2021/0029248 | A1 | 1/2021 | Scodary et al. |

OTHER PUBLICATIONS

U.S. Appl. No. 16/240,232, Non-Final Office Action, dated Jan. 4, 2022, 15 pages.
U.S. Appl. No. 16/408,224, Notice of Allowance, dated Jan. 7, 2022, 9 pages.
U.S. Appl. No. 16/736,517, Non-Final Office Action, dated Dec. 8, 2021, 17 pages.
U.S. Appl. No. 16/736,517, Notice of Allowance, dated Feb. 10, 2022, 11 pages.
U.S. Appl. No. 16/822,563, Notice of Allowance, dated Mar. 2, 2022, 16 pages.
European Application No. EP18727946.8 , Office Action, dated Dec. 15, 2021, 7 pages.
Indian IN201947044096, "First Examination Report", dated Jan. 13, 2022, 5 pages.
Sadek et al., "A Discourse-Based Approach for Arabic Question Answering", ACM Transactions on Asian and Low-Resource Language Information Processing, vol. 16, No. 2, Article 11, Nov. 2016, pp. 1-18.
Sadek et al., "Arabic Rhetorical Relations Extraction for Answering "Why" and "How to" Questions", NLDB'12: Proceedings of the 17th international conference on Applications of Natural Language Processing and Information Systems, Jun. 2012, pp. 385-390.
Verberne et al., "Discourse-Based Answering of Why-Questions", TAL Traitement Automatique des Langues, vol. 47, Sep. 2007, pp. 21-41.
U.S. Appl. No. 16/789,849, Non-Final Office Action dated Feb. 17, 2022, 23 pages.
Yao et al., Semantics-Based Question Generation and Implementation, Dialogue & Discourse, vol. 3, No. 2, 2012, pp. 11-42.
2009 Annual Study: Global Cost of a Data Breach, Ponemon Institute, LLC, PGP, Apr. 2010, 36 pages.
Data Loss Prevention, Trend Micro, Available online at: http://www.trendmicro.co.in/cloud-content/us/pdfs/business/datasheets/ds_data-loss-prevention.pdf, 2010, 2 pages.

(56) References Cited

OTHER PUBLICATIONS

Data Loss Prevention & Protection, Symantec, Available online at: http://www.symantec.com/business/theme.jsp?themeid=vontu, Accessed from Internet on Aug. 30, 2018, 6 pages.
Exploring Dialog Management for Bots, Chatbots Magazine, Available online at: https://chatbotsmagazine.com/exploring-dialog-management-for-bots-cbb8665a2fd3, Jul. 11, 2016, 7 pages.
Global Security Report 2010, Trustwave, Available online at: https://www.trustwave.com/Resources/Library/Documents/2010-Trustwave-Global-Security-Report/, 2010, 49 pages.
Ignore, Deny, Downplay: Accounts of Syrians from Douma Have No Place in Western Narrative, Russia Today, Available online at: https://www.rt.com/news/425438-douma-witnesses-gas-attack-syria/, Apr. 28, 2018, pp. 1-8.
Malaysia Airlines Flight 17, Wikipedia, 2016, pp. 1-38.
Shadow Chairman of Investigative Committee, Crime Russia, Available online at: https://crimerussia.com/corruption/tenevoy-direktor-skr/, Aug. 25, 2016, 5 pages.
Welcome to Apache Lucene, Apache Lucene 7.5.0 and Apache Solr 7.5.0, Available online at: www.lucene.apache.org, Sep. 24, 2018, 38 pages.
U.S. Appl. No. 16/145,702, Final Office Action, dated Sep. 10, 2019, 25 pages.
U.S. Appl. No. 16/145,702, First Action Interview Office Action Summary dated Apr. 29, 2019, 8 pages.
U.S. Appl. No. 16/145,702, First Action Interview Pilot Program Pre-Interview Communication dated Feb. 7, 2019, 6 pages.
Airenti et al., Conversation and Behavior Games in the Pragmatics of Dialogue, Cognitive Science, vol. 17, No. 2, Apr.-Jun. 1993, pp. 197-256.
Allen et al., Analyzing Intention in Utterances, Artificial Intelligence, vol. 15, No. 3, Dec. 1980, pp. 143-178.
Bengio et al., A Neural Probabilistic Language Model, Journal of Machine Learning Research, vol. 3, Feb. 3, 2003, pp. 1137-1155.
Blaylock, Managing Communicative Intentions in Dialogue Using a Collaborative Problem-Solving Model, The University of Rochester, Computer Science Department, Technical Report 774, Apr. 2002, 56 pages.
Blaylock et al., Managing Communicative Intentions with Collaborative Problem Solving, Current and New Directions in Discourse and Dialogue, 2003, pp. 63-84.
Boyer et al., MJRTY—A Fast Majority Vote Algorithm, Chapter 5, Automated Reasoning, 1991, pp. 105-117.
Carlson et al., Discourse Tagging Reference Manual, Available Online at https://www.isi.edu/~marcu/discourse/tagging-ref-manual.pdf, Sep. 11, 2001, 87 pages.
Chali et al., Complex Question Answering: Unsupervised Learning Approaches and Experiments, Journal of Artificial Intelligence Research, vol. 35, May 2009, pp. 1-47.
Chen, Understanding Mental States in Natural Language, Proceedings of the 8th International Conference on Computational Semantics, Jan. 2009, pp. 61-72.
Cohen, Enron Email Dataset, Available online at: https://www.cs.cmu.edu/~enron/, Aug. 21, 2009, 1 page.
Cohen et al., Intention is Choice with Commitment, Artificial Intelligence, vol. 42, No. 2-3, Mar. 1990, pp. 213-261.
Collins et al., "New Ranking Algorithms for Parsing and Tagging: Kernels Over Discrete Structures, and The Voted Perceptron", Proceedings of the 40th Annual Meeting of the Association for Computational Linguistics (ACL), Philadelphia, Jul. 2002, pp. 263-270.
Cristea et al., Veins Theory: A Model of Global Discourse Cohesion and Coherence, Research Report TR98—Dept. of Computer Science, 1998, pp. 281-285.
Croft et al., Search Engines—Information Retrieval in Practice, Pearson Education, 2010, 542 pages.
De Boni, Using Logical Relevance for Question Answering, Journal of Applied Logic, vol. 5, No. 1, Mar. 2007, pp. 92-103.
De Mori et al., Spoken Language Understanding, IEEE Signal Processing Magazine, vol. 25, No. 3, May 2008, pp. 50-58.

Dijkstra, Programming Considered as a Human Activity, Proc. IFIP Congress, 1965, 7 pages.
Ebrahim, NLP Tutorial Using Python NLTK (Simple Examples), Available Online at https://dzone.com/articles/nlp-tutorial-using-python-nltk-simple-examples, Sep. 24, 2017, pp. 1-10.
Endres-Niggemeyer et al., Summarizing Text for Intelligent Communication, Dagstuhl Seminar Report 79, 1995, 36 pages.
Feng et al., A Linear-Time Bottom-Up Discourse Parser with Constraints and Post-Editing, In Proceedings of the 52nd Annual Meeting of the Association for Computational Linguistics, Jun. 23-25, 2014, pp. 511-521.
Feng et al., Classifying Arguments by Scheme, In Proceedings of the 49th Annual Meeting of the Association for Computational Linguistics, vol. 1, Jun. 19-24, 2011, pp. 987-996.
Feng et al., Distributional Footprints of Deceptive Product Reviews, Proceedings of the Sixth International AAAI Conference on Weblogs and Social Media, The AAAI Press, Jan. 2012, pp. 98-105.
Feng, RST—Style Discourse Parsing and Its Applications in Discourse Analysis, University of Toronto, Jun. 2015, 189 pages.
Feng et al., Syntactic Stylometry for Deception Detection, In ACL 12, Proceedings of the 50th Annual Meeting of the Association for Computational Linguistics, Jul. 8-14, 2012, pp. 171-175.
Ferraiolo et al., Role-Based Access Controls, Proceedings of the 15th NIST-NSA National Computer Security Conference, Oct. 13-16, 1992, pp. 554-563.
Finn et al., A Linear-Time Bottom-Up Discourse Parser with Constraints and Post-Editing, In Proceedings of the 52nd Annual Meeting of the Association for Computational Linguistics, Jun. 23-25, 2014, pp. 511-521.
Fornaciari et al., Identifying Fake Amazon Reviews as Learning from Crowds, In Proceedings of the 14th Conference of the European Chapter of the Association for Computational Linguistics, Apr. 26-30, 2014, pp. 279-287.
Galitsky et al., Concept-Based Learning of Human Behavior for Customer Relationship Management, Information Sciences, vol. 181, No. 10, May 15, 2011, pp. 2016-2035.
Galitsky, Discovering Rhetorical Agreement between a Request and Response, Dialogue & Discourse, vol. 8, No. 2, Dec. 1, 2017, pp. 167-205.
Galitsky et al., Improving Text Retrieval Efficiency with Pattern Structures on Parse Thickets, Formal Concept Analysis Meets Information Retrieval, ECIR, 2013, 16 pages.
Galitsky et al., Improving Trust in Automation of Social Promotion, Association for the Advancement of Artificial Intelligence, 2014, pp. 28-35.
Galitsky et al., Inferring the Semantic Properties of Sentences by Mining Syntactic Parse Trees, Data & Knowledge Engineering, vols. 81-82, Nov.-Dec. 2012, 44 pages.
Galitsky et al., Learning Communicative Actions of Conflicting Human Agents, Journal of Experimental & Theoretical Artificial Intelligence, vol. 20, No. 4, Dec. 2008, pp. 277-317.
Galitsky, Learning Noisy Discourse Trees, Computational Linguistics and Intellectual Technologies, Proceedings of the International Conference, Dialogue 2017. Available online at: http://www.dialog-21.ru/media/3911/galitskyb.pdf, May 31-Jun. 3, 2017, 14 pages.
Galitsky, Learning Parse Structure of Paragraphs and its Applications in Search, Engineering Applications of Artificial Intelligence, vol. 32, Jun. 2014, pp. 160-184.
Galitsky, Machine Learning of Syntactic Parse Trees for Search and Classification of Text, Engineering Applications of Artificial Intelligence, vol. 26, No. 3, Mar. 2013, pp. 1072-1091.
Galitsky, Matching Parse Thickets for Open Domain Question Answering, Data & Knowledge Engineering, vol. 107, Dec. 9, 2016, pp. 24-50.
Galitsky, Natural Language Question Answering System, Technique of Semantic Headers, Advanced Knowledge International, vol. 2, Apr. 2003, 333 pages.
Galitsky et al., On a Chat Bot Finding Answers with Optimal Rhetoric Representation, RANLP—Recent Advances in Natural Language Processing Meet Deep Learning, Nov. 10, 2017, pp. 253-259.

(56) References Cited

OTHER PUBLICATIONS

Galitsky et al., Parse Thicket Representations for Answering Multi-Sentence Search, International Conference on Conceptual Structures, 2013, 13 pages.
Galitsky et al., Rhetoric Map of an Answer to Compound Queries, In Proceedings of the 53rd Annual Meeting of the 20 Association for Computational Linguistics and the 7'th International Joint Conference of Natural Language Processing, Jul. 26-31, 2015, pp. 681-686.
Galitsky et al., Text Classification into Abstract Classes Based on Discourse Structure, Proceedings of Recent Advances in Natural Language Processing, Sep. 7-9, 2015, pp. 200-207.
Galitsky et al., Text Integrity Assessment: Sentiment Profile vs Rhetoric Structure, CICLing, Springer International Publishing, Apr. 14-20, 2015, pp. 126-139.
Galitsky, Using Extended Tree Kernels to Recognize Metalanguage in Text, Studies in Computational Intelligence, Feb. 2017, 26 pages.
Grefenstette et al., Multi-Step Regression Learning for Compositional Distributional Semantics, In Proceedings of the 26 Tenth International Conference on Computational Semantics. Association for Computational Linguistics, Mar. 2013, 11 pages.
Grefenstette, Towards a Formal Distributional Semantics: Simulating Logical Calculi with Tensors, University of Oxford, Apr. 2013, 10 pages.
Grosz et al., Attention, Intentions, and the Structure of Discourse, Computational Linguistics, vol. 12, No. 3, Jul.-Sep. 1986, pp. 175-204.
Grosz et al., Discourse Analysis, in Understanding Spoken Language, Elsevier North-Holland, 1978, pp. 234-268.
Halliday et al., Cohesion in English, vol. 14, No. 1, 1980, pp. 47-50.
Hart et al., Text Classification for Data Loss Prevention, Proceedings of the 11th International Conference on Privacy Enhancing Technologies, Hewlett-Packard Development Company, L.P., Jul. 27-29, 2011, 21 pages.
Haussler, Convolution Kernels on Discrete Structures UCSC-CRL-99-10, UCSB Technical Report, Jul. 8, 1999, 38 pages.
Hernault et al., A Sequential Model for Discourse Segmentation, Proceedings of the 11th International Conference on Computational Linguistics and Intelligent Text Processing, Mar. 21-27, 2010, pp. 315-326.
Houngbo et al., An Automated Method to Build A Corpus of Rhetorically-Classified Sentences in Biomedical Texts, Proceedings of the First Workshop on Argumentation Mining, Association for Computational Linguistics, Jun. 26, 2014, pp. 19-23.
Iruskieta et al., A Qualitative Comparison Method for Rhetorical Structures: Identifying Different Discourse Structures in Multilingual Corpora, Lang Resources & Evaluation, vol. 49, No. 2, May 8, 2014, 47 pages.
Jansen et al., Discourse Complements Lexical Semantics for Non-Factoid Answer Reranking, In Proceedings of the 52nd Annual Meeting of the Association for Computational Linguistics, Jun. 23-25, 2014, pp. 977-986.
John et al., Estimating Continuous Distributions in Bayesian Classifiers, Proceedings of the Eleventh Conference on Uncertainty in Artificial Intelligence, 1995, pp. 338-345.
Joty et al., A Novel Discriminative Framework for Sentence-Level Discourse Analysis, Proceedings of the Joint Conference on Empirical Methods in Natural Language Processing and Computational Natural Language Learning, Jul. 12-14, 2012, pp. 904-915.
Joty et al., CODRA: A Novel Discriminative Framework for Rhetorical Analysis, Computational Linguistics, vol. 41, No. 3, Mar. 18, 2015, pp. 385-435.
Joty et al., Combining Intra- and Multi-Sentential Rhetorical Parsing for Document-Level Discourse Analysis, 51st Annual Meeting of the Association for Computational Linguistics, Aug. 4-9, 2013, pp. 486-496.
Joty et al., Discriminative Reranking of Discourse Parses Using Tree Kernels, Proceedings of the 2014 Conference on Empirical Methods in Natural Language Processing, Oct. 25-29, 2014, pp. 2049-2060.
Jurafsky et al., Speech and Language Processing: An Introduction to Natural Language Processing, Computational Linguistics, and Speech Recognition, Pearson, Prentice Hall, 2000, pp. 719-761.
Kate et al., Learning to Transform Natural to Formal Languages, Proceedings of the 20th National Conference on Artificial Intelligence, Jul. 2005, pp. 1062-1068.
Khardon et al., The Subsumption Lattice and Query Learning, Journal of Computer and System Sciences, vol. 72, Issue 1, Feb. 2006, pp. 72-94.
Kipper et al., A Large-Scale Classification of English Verbs, Language Resources and Evaluation, vol. 42, No. 1, Mar. 2008, pp. 21-40.
Kipper et al., VerbNet Overview, Extensions, Mappings and Applications, Proceedings of Human Language Technologies, Annual Conference of the North American Chapter of the Association for Computational Linguistics, Companion, vol. Tutorial Abstracts, Jun. 2009, pp. 13-14.
Kirschner et al., Linking the Thoughts: Analysis of Argumentation Structures in Scientific Publications, Proceedings of the 2nd Workshop on Argumentation Mining, Jun. 4, 2015, pp. 1-11.
Kohavi, A Study of Cross-Validation and Bootstrap for Accuracy Estimation and Model Selection, International Joint Conference on Artificial Intelligence, Aug. 1995, pp. 1137-1143.
Kong et al., Improve Tree Kernel-Based Event Pronoun Resolution with Competitive Information, Proceedings of the Twenty-Second International Joint Conference on Artificial Intelligence, vol. 3, Jul. 16-22, 2011, pp. 1814-1819.
Kontos et al., Question Answering and Rhetoric Analysis of Biomedical Texts in the Aroma System, National and Kapodistrian University of Athens, Unpublished Manuscript, 2006, 6 pages.
Kovalerchuk et al., Toward Virtual Data Scientist with Visual Means, International Joint Conference on Neural Networks, Feb. 2017, pp. 3073-3080.
Levinson, Presumptive Meanings: The Theory of Generalized Conversational Implicature, Cambridge, MA: The MIT Press, 2000, 10 pages.
Li et al., Recursive Deep Models for Discourse Parsing, Computer Science Department, Jan. 2014, 10 pages.
Lin et al., Recognizing Implicit Discourse Relations in the Penn Discourse Treebank, Proceedings of the Conference on Empirical Methods in Natural Language Processing, vol. 1, Aug. 6-7, 2009, pp. 343-351.
Litman et al., A Plan Recognition Model for Subdialogues in Conversations, Cognitive Science, vol. 11, No. 2, Apr. 1987, pp. 163-200.
Makhalova et al., Pattern Structures for News Clustering, Proceedings of the 4th International Conference on What can FCA do for Artificial Intelligence, vol. 1430, Jan. 2015, pp. 35-42.
Mann et al., Discourse Structures for Text Generation, Proceedings of the 10th International Conference on Computational Linguistics and 22nd annual meeting on Association for Computational Linguistics, Jul. 2-6, 1984, pp. 367-375.
Mann et al., Rhetorical Structure Theory and Text Analysis, University of Southern California, Nov. 1989, 66 pages.
Mann et al., Rhetorical Structure Theory: Towards a Functional Theory of Text Organization, Text-Interdisciplinary Journal for the Study of Discourse, vol. 8, No. 3, Jan. 1988, pp. 243-281.
Mercier et al., Why Do Humans Reason? Arguments for an Argumentative Theory, Behavioral and Brain Sciences, vol. 34, No. 2, Apr. 2011, pp. 57-111.
Mikolov et al., Distributed Representations of Phrases and Their Compositionality, Proceedings of the 26th International Conference on Neural Information Processing Systems, vol. 2, Dec. 5-10, 2013, pp. 1-9.
Mitchell et al., Composition in Distributional Models of Semantics, Cognitive Science, vol. 34, No. 8, Mar. 25, 2010, pp. 1388-1429.
Mitocariu et al., Comparing Discourse Tree Structures, Computational Linguistics and Intelligent Text Processing: 14th International Conference, vol. 7816, Mar. 24-30, 2013, 11 pages.
Mochales et al., Argumentation Mining, Artificial Intelligence and Law, vol. 19, No. 1, Mar. 2011, pp. 1-22.

(56) References Cited

OTHER PUBLICATIONS

Mukherjee et al., Fake Review Detection: Classification and Analysis of Real and Pseudo Reviews, Technical Report, Department of Computer Science, 2013, 11 pages.
Mukherjee et al., What Yelp Fake Review Filter Might Be Doing?, Proceedings of the Seventh International AAAI Conference on Weblogs and Social Media, Jan. 2013, pp. 409-418.
Ott et al., Finding Deceptive Opinion Spam by Any Stretch of the Imagination, Proceedings of the 49th Annual Meeting of the Association for Computational Linguistics, vol. 1, Jun. 19-24, 2011, pp. 309-319.
Ott et al., Negative Deceptive Opinion Spam, Proceedings of the Conference of the North American Chapter of the Association for Computational Linguistics, Jun. 9-14, 2013, pp. 497-501.
International Application No. PCT/US2018/053392, International Search Report and Written Opinion dated Dec. 17, 2018, 11 pages.
International Application No. PCT/US2019/015696, International Search Report and Written Opinion dated Apr. 23, 2019, 12 pages.
International Application No. PCT/US2019/031580, International Search Report and Written Opinion dated Jul. 5, 2019, 12 pages.
Peldszus et al., From Argument Diagrams to Argumentation Mining in Texts: A Survey, International Journal of Cognitive Informatics and Natural Intelligence, vol. 7, No. 1, Jan. 2013, pp. 1-31.
Pendyala et al., Towards a Truthful World Wide Web from a Humanitarian Perspective, IEEE 2015 Global Humanitarian Technology Conference, Oct. 8-11, 2015, 7 pages.
Plotkin, A Note on Inductive Generalization, vol. 5, From Machine Intelligence, 1970, pp. 153-163.
Ponti, Machine Learning Techniques Applied to Dependency Parsing, University of Pavia, Available Online at: https://vision.unipv.it/AI/AIRG/MachineLearningTechniquesAppliedToDependencyParsingRevised.pdf, Oct. 2015, 45 pages.
Popescu et al., Logic-Based Rhetorical Structuring for Natural Language Generation in Human-Computer Dialogue, Proceedings of the 10th International Conference on Text, Speech and Dialogue, Sep. 3-7, 2007, pp. 309-317.
Popescu-Belis, Dialogue Acts: One or More Dimensions?, ISSCO Working Paper No. 62, University of Geneva, Nov. 2005, 46 pages.
Radev, A Common Theory of Information Fusion from Multiple Text Sources Step One: Cross-document Structure, Proceedings of the 1st SIGDial Workshop on Discourse and Dialogue, vol. 10, Oct. 7-8, 2000, pp. 74-83.
Radev et al., Centroid-Based Summarization of Multiple Documents: Sentence Extraction, Utility-Based Evaluation, 60 and User Studies, Proceedings of the NAACL-ANLP Workshop on Automatic Summarization, vol. 4, 2000, 10 pages.
Rayana et al., Collective Opinion Spam Detection: Bridging Review Networks and Metadata, Proceedings of the 21st ACM SIGKDD International Conference on Knowledge Discovery and Data Mining, Aug. 11-14, 2015, 10 pages.
Recasens et al., The Life and Death of Discourse Entities: Identifying Singleton Mentions, Proceedings of NAACL-HLT, Jun. 9-14, 2013, pp. 627-633.
Reed et al., Language Resources for Studying Argument, Proceedings of the 6th Conference on Language Resources and Evaluation, LREC2008, ELRA, 2010, pp. 2613-2618.
Reichman, Getting Computers to Talk Like You and Me, Discourse Context, Focus and Semantics (An ATN Model), MIT Press, Jul. 1985, pp. 35-49.
Robinson et al., A Machine-Oriented Logic Based on the Resolution Principle, vol. 12, Issue 1, Jan. 1965, pp. 23-41.
Salton et al., On the Specification of Term Values in Automatic Indexing, Journal of Documentation, vol. 29, No. 4, Apr. 1973, pp. 351-372.
Salton et al., Term Weighting Approaches in Automatic Text Retrieval, Information Processing & Management, vol. 24, No. 5, Nov. 1987, 22 pages.
Santhosh et al., Discourse Based Advancement on Question Answering System, International Journal on Soft Computing, Artificial Intelligence and Applications (IJSCAI), vol. 1, No. 2, Oct. 2012, 12 pages.
Scholman et al., A Step-Wise Approach to Discourse Annotation: Towards a Reliable Categorization of Coherence 64 Relations, Categories of Coherence Relations in Discourse Annotation. Dialogue & Discourse, vol. 7, No. 2, Feb. 2016, 28 pages.
Searle, Speech Acts: An Essay in the Philosophy of Language, Cambridge University Press, Jan. 1969, pp. 22-53.
Sjoera, The Linguistics Behind Chat Bots, iCapps, Available online at: http://www.icapps.com/the-linguistics-behind-chatbots/, Feb. 22, 2017, 9 pages.
Socher et al., Recursive Deep Models for Semantic Compositionality Over a Sentiment Treebank, Proceedings of the 2013 Conference on Empirical Methods in Natural Language Processing, EMNLP, Oct. 2013, pp. 1631-1642.
Sperber et al., Relevance: Communication and Cognition, Blackwell, Oxford and Harvard University Press, Cambridge, MA, 1986, 331 pages.
Sun et al., Exploiting Product Related Review Features for Fake Review Detection, Mathematical Problems in Engineering, vol. 2016, Article ID 4935792, Jul. 4, 2016, 7 pages.
Sun et al., Exploring Syntactic Structural Features for Sub-Tree Alignment Using Bilingual Tree Kernels, Proceedings of the 48th Annual Meeting of the Association for Computational Linguistics, Jul. 2010, pp. 306-315.
Surdeanu et al., Two Practical Rhetorical Structure Theory Parsers, Proceedings of the Conference of the North American Chapter of the Association for Computational Linguistics—Human Language Technologies, Jun. 5, 2015, pp. 1-5.
Traum et al., Conversation Acts in Task-Oriented Spoken Dialogue, University of Rochester Computer Science, Computational Intelligence, vol. 8, No. 3, Aug. 1992, 31 pages.
Traum et al., Discourse Obligations in Dialogue Processing, Proceedings of the 32nd Annual Meeting on Association for Computational Linguistics, Jun. 27-30, 1994, pp. 1-8.
Traum, Rhetorical Relations, Action and Intentionality in Conversation, Proceedings ACL SIG Workshop on Intentionality and Structure in Discourse Relations, Jun. 1993, pp. 132-135.
Trstenjak et al., KNN with TF-IDF Based Framework for Text Categorization, Procedia Engineering, vol. 69, 24th DAAAM International Symposium on Intelligent Manufacturing and Automation, 2014, pp. 1356-1364.
Tsui, English Conversation. Describing English Language, Oxford University Press, 1994, 37 pages.
Uliyara, Primer: Oracle Intelligent Bots, Powered by Artificial Intelligence, White Paper, Sep. 2017, 28 pages.
Van Der Wees et al., Five Shades of Noise: Analyzing Machine Translation Errors in User-Generated Text, Proceedings of the ACL 2015 Workshop on Noisy User-generated Text, Jul. 31, 2015, pp. 28-37.
Vapnik, The Nature of Statistical Learning Theory, Springer Science, 1995, 201 pages.
Walker et al., Quantitative and Qualitative Evaluation of Darpa Communicator Spoken Dialogue Systems, Proceedings of the 39th Annual Meeting of the Association for Computational Linguistics, Jul. 6-11, 2001, pp. 515-522.
Wang et al., Kernel Based Discourse Relation Recognition with Temporal Ordering Information, Proceedings of the 48th Annual Meeting of the Association for Computational Linguistics, Jul. 11-16, 2010, pp. 710-719.
Wang et al., Using Learning Analytics to Understand the Design of an Intelligent Language Tutor-Chatbot Lucy, International Journal of Advanced Computer Science and Applications, vol. 4, No. 11, Nov. 2013, pp. 124-131.
Wu et al., Enhancing Text Representation for Classification Tasks with Semantic Graph Structures, International Journal of Innovative Computing, Information and Control, vol. 7, No. 5 (B), May 2011, pp. 2689-2698.
Wuchner et al., Data Loss Prevention Based on Data-Driven Usage Control, Proceedings of the IEEE 23rd International Symposium on Software Reliability Engineering, Nov. 27-30, 2012, pp. 151-160.

(56) References Cited

OTHER PUBLICATIONS

Yao et al., Online Deception Detection Refueled by Real World Data Collection, Proceedings of Recent Advances in Natural Language Processing, Jul. 28, 2017, 10 pages.

Yessenalina et al., Compositional Matrix-Space Models for Sentiment Analysis, Proceedings of the 2011 Conference on Empirical Methods in Natural Language Processing, Jul. 27-31, 2011, pp. 172-182.

Zanzotto et al., Estimating Linear Models for Compositional Distributional Semantics, Proceedings of the 23rd International Conference on Computational Linguistics (COLING 2010), Aug. 23-27, 2010, pp. 1263-1271.

Zeilenga, Lightweight Directory Access Protocol (LDAP) Read Entry Controls, Standards Track, Network Working Group, IETF, RFC 4527, Jun. 2006, 8 pages.

Zhao et al., Facilitating Discourse Analysis with Interactive Visualization, IEEE Transactions on Visualization and Computer Graphics, vol. 18, No. 12, Dec. 2012, pp. 2639-2648.

U.S. Appl. No. 16/240,232, Final Office Action, dated Oct. 21, 2021, 13 pages.

Indian IN202047007447, "First Examination Report", dated Sep. 9, 2021, 6 pages.

U.S. Appl. No. JP2019-561757, Office Action, dated Sep. 21, 2021, 3 pages.

U.S. Appl. No. 15/975,683, Notice of Allowance, dated Jun. 12, 2020, 17 pages.

U.S. Appl. No. 15/975,685, Notice of Allowance, dated Jul. 24, 2020, 17 pages.

U.S. Appl. No. 16/010,141, Final Office Action, dated Jul. 30, 2020, 14 pages.

U.S. Appl. No. 16/145,702, Final Office Action, dated May 6, 2020, 19 pages.

U.S. Appl. No. 16/145,702, Notice of Allowance, dated Jul. 1, 2020, 15 pages.

U.S. Appl. No. 16/145,777, Notice of Allowance, dated Jul. 15, 2020, 17 pages.

U.S. Appl. No. 16/260,930, Non-Final Office Action, dated Aug. 12, 2020, 9 pages.

U.S. Appl. No. 16/260,939, Non-Final Office Action, dated May 1, 2020, 10 pages.

U.S. Appl. No. 16/260,939, Notice of Allowance, dated Jun. 12, 2020, 14 pages.

Galitsky et al., "Finding Maximal Common Sub-Parse Thickets for Multi-Sentence Search", IJCAI Workshop on Graphs and Knowledge Representation, IJCAI, 2013, 19 pages.

Hara et al., "Exploring Difficulties in Parsing Imperatives and Questions", Proceedings of the 5th International Joint Conference on Natural Language Processing, Nov. 8-13, 2011, pp. 749-757.

Kipper et al., "A Large-scale Classification of English Verbs", Kluwer Academic Publishers, Springer Netherland, Dec. 2006, 20 pages.

International Application No. PCT/US2019/015696, International Preliminary Report on Patentability, dated Aug. 13, 2020, 8 pages.

U.S. Appl. No. 15/975,683, "Non-Final Office Action", dated Mar. 19, 2020, 16 pages.

U.S. Appl. No. 15/975,683, "Non-Final Office Action", dated Oct. 31, 2019, 27 pages.

U.S. Appl. No. 15/975,685, "Non-Final Office Action", dated Apr. 1, 2020, 23 pages.

U.S. Appl. No. 15/975,685, "Non-Final Office Action", dated Nov. 15, 2019, 23 pages.

U.S. Appl. No. 16/010,091, "Non-Final Office Action", dated Nov. 18, 2019, 26 pages.

U.S. Appl. No. 16/010,091, "Notice of Allowance", dated Mar. 19, 2020, 13 pages.

U.S. Appl. No. 16/010,141, "Non-Final Office Action", dated Feb. 24, 2020, 12 pages.

U.S. Appl. No. 16/010,156, "Notice of Allowance", dated Feb. 6, 2020, 13 pages.

U.S. Appl. No. 16/010,156, "Notice of Allowance", dated Nov. 7, 2019, 13 pages.

U.S. Appl. No. 16/145,702, "Non-Final Office Action", dated Feb. 5, 2020, 30 pages.

U.S. Appl. No. 16/145,777, "Non-Final Office Action", dated Apr. 3, 2020, 18 pages.

Artooras et al., "Stanford NLP-VP vs NP", Stack Overflow Website, Available online at: https://stackoverflow.com/questions/35872324/stanford-nlp-vp-vs-np/35887762, Mar. 8-9, 2016, 2 pages.

Galitsky et al., "Finding Maximal Common Sub-parse Thickets for Multi-sentence Search", Graph Structures for Knowledge Representation and Reasoning, 2014, pp. 39-57.

Galitsky et al., "Style and Genre Classification by Means of Deep Textual Parsing", Computational Linguistics and Intellectual Technologies: Proceedings of the International Conference "Dialogue 2016", Jun. 2016, pp. 1-45.

Galitsky et al., "Text Classification Based on Deep Textual Parsing", Available online at: http://ceur-ws.org/Vol-1886/paper_8.pdf, 2011, pp. 1-9.

Johnson et al., "The FrameNet Tagset for Frame-Semantic and Syntactic Coding of Predicate-Argument Structure", RightsLink, 2011, pp. 56-62.

Kittredge et al., "An Advanced English Grammar with Exercises", The Athenaeum Press, 1913, 266 pages.

Marcu et al., "An Unsupervised Approach to Recognizing Discourse Relations", Proceedings of the 40th Annual Meeting of the Association for Computational Linguistics (ACL), 2002, 8 pages.

Tai et al., "Improved Semantic Representations from Tree-Structured Long Short-Term Memory Networks", Available Online at: https://arxiv.org/pdf/1503.00075.pdf, May 30, 2015, 11 pages.

International Application No. PCT/US2018/053392, "International Preliminary Report on Patentability", dated Apr. 9, 2020, 7 pages.

U.S. Appl. No. 16/010,123, Notice of Allowance, dated May 19, 2021, 16 pages.

U.S. Appl. No. 16/240,232, Non-Final Office Action, dated Apr. 9, 2021, 13 pages.

U.S. Appl. No. 16/010,123, Non-Final Office Action, dated Feb. 8, 2021, 30 pages.

Mathkour, "A Novel Rhetorical Structure Approach for Classifying Arabic Security Documents", International Journal of Computer Theory and Engineering, vol. 1, No. 3, Aug. 2009, pp. 195-200.

International Application No. PCT/US2019/031580, International Preliminary Report on Patentability, dated Nov. 19, 2020, 8 pages.

U.S. Appl. No. 16/240,232, Final Office Action, dated Apr. 21, 2022, 15 pages.

U.S. Appl. No. 16/841,200, Notice of Allowance, dated Apr. 14, 2022, 13 pages.

Indian Application No. IN202047028577, "First Examination Report", dated May 17, 2022, 7 pages.

U.S. Appl. No. 16/789,849, "Non-Final Office Action", dated Jul. 1, 2022, 25 pages.

\* cited by examiner

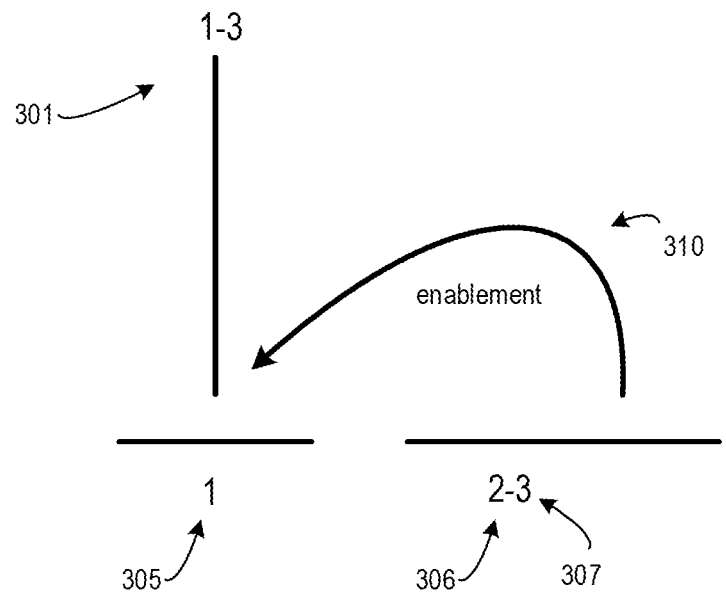
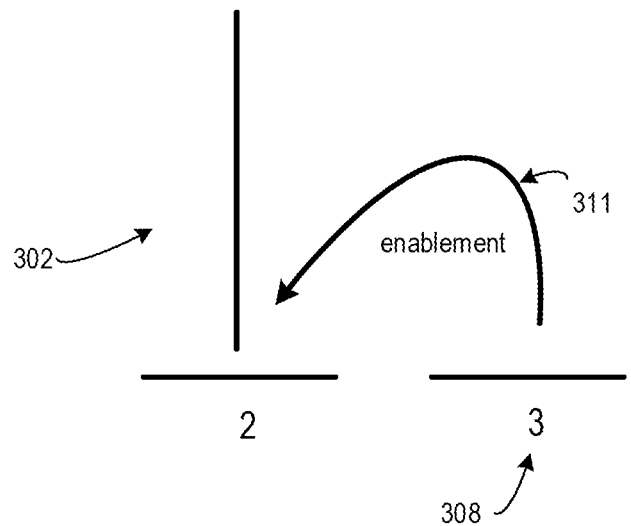
FIG. 3

| 2000 | 2001 | 2002 | 2003 |
|---|---|---|---|
| | granite kitchen | granite island kitchen # | upgraded kitchen ǀ updated kitchen ǀ next to the kitchen ǀ newer |
| | stainless kitchen | upgraded stainless steal viking kitchen # | upgraded kitchen ǀ updated kitchen ǀ next to the kitchen ǀ newer |
| | large kitchen | large open kitchen # beautiful large kitchen # large remodeled kitchen # large eat-in kitchen # | upgraded kitchen ǀ updated kitchen ǀ next to the kitchen ǀ newer |
| | open kitchen | large open kitchen # room, open kitchen # an open kitchen if open family/media room off kitchen # nice open kitchen | upgraded kitchen ǀ updated kitchen ǀ next to the kitchen ǀ newer |
| | outdoor kitchen | covered patio with outdoor kitchen # | upgraded kitchen ǀ updated kitchen ǀ next to the kitchen ǀ newer |
| | gourmet kitchen | a beautiful, gourmet kitchen # combo, gourmet kitchen # gourmet chef's kitchen # custom gourmet kitchen # | upgraded kitchen ǀ updated kitchen ǀ next to the kitchen ǀ newer |
| | beautiful kitchen | a beautiful, gourmet kitchen # beautiful large kitchen # a beautiful kitchen # beautiful updated kitchen # beautiful | upgraded kitchen ǀ updated kitchen ǀ next to the kitchen ǀ newer |
| | great kitchen | true great-room with kitchen # great size kitchen # | upgraded kitchen ǀ updated kitchen ǀ next to the kitchen ǀ newer |
| | remodeled kitchen | a remodeled kitchen # large remodeled kitchen # a remodeled country kitchen # | upgraded kitchen ǀ updated kitchen ǀ next to the kitchen ǀ newer |
| | new kitchen | all new kitchen # brand new kitchen # | upgraded kitchen ǀ updated kitchen ǀ next to the kitchen ǀ newer |
| | dining kitchen | hardwood floors in dining kitchen # dining off kitchen # dining area in kitchen # | upgraded kitchen ǀ updated kitchen ǀ next to the kitchen ǀ newer |
| | area kitchen | dining area in kitchen # | upgraded kitchen ǀ updated kitchen ǀ next to the kitchen ǀ newer |
| | room open kitchen | room, open kitchen # open family/media room off kitchen # | upgraded kitchen ǀ updated kitchen ǀ next to the kitchen ǀ newer |
| | country kitchen | entry & country kitchen # eat-in country kitchen # a remodeled country kitchen # | upgraded kitchen ǀ updated kitchen ǀ next to the kitchen ǀ newer |
| | entry kitchen | entry & country kitchen # eat-in country kitchen # | upgraded kitchen ǀ updated kitchen ǀ next to the kitchen ǀ newer |
| | big kitchen | fire place and big kitchen # | upgraded kitchen ǀ updated kitchen ǀ next to the kitchen ǀ newer |
| | off kitchen | room off of kitchen # dining off kitchen # open family/media room off kitchen # | upgraded kitchen ǀ updated kitchen ǀ next to the kitchen ǀ newer |
| | tile kitchen | tile countertops in kitchen # tile roof-fabulous kitchen # | upgraded kitchen ǀ updated kitchen ǀ next to the kitchen ǀ newer |
| | stunning kitchen | stunning family kitchen # | upgraded kitchen ǀ updated kitchen ǀ next to the kitchen ǀ newer |
| | entertaining kitchen | gatherings and entertaining kitchen # | upgraded kitchen ǀ updated kitchen ǀ next to the kitchen ǀ newer |
| | excellent property | excellent corner property # | excellent property ǀ great property very clean property ǀ a half b |
| | great property | a great rental property # | excellent property ǀ great property very clean property ǀ a half b |
| | horse property | fence horse property # | excellent property ǀ great property very clean property ǀ a half b |
| | investment property | an investment property # | excellent property ǀ great property very clean property ǀ a half b |
| | pane windows | dual pane windows# newer dual pane windows # dual-pane windows # double pane windows # some dual pane w | dual pane windows ǀ anderson windows ǀ new windows ǀ hvac an |
| | dual windows | dual pane windows # newer dual pane windows # dual-pane windows # dual paned windows # some dual pane wf | dual pane windows ǀ anderson windows ǀ new windows ǀ hvac an |
| | new windows | new milgard windows # some new windows # new paint, dual pane windows # all new dual pane windows # new c | dual pane windows ǀ anderson windows ǀ new windows ǀ hvac an |
| | newer windows | newer dual pane windows N newer dual-paned windows # newer roof - newer windows # | dual pane windows ǀ anderson windows ǀ new windows ǀ hvac an |
| | updated windows | a few updated windows # | dual pane windows ǀ anderson windows ǀ new windows ǀ hvac an |
| | ceiling windows | floor to ceiling windows # open beam ceiling and large windows # ceiling and windows # | dual pane windows ǀ anderson windows ǀ new windows ǀ hvac an |
| | large windows | open beam ceiling and large windows # | dual pane windows ǀ anderson windows ǀ new windows ǀ hvac an |
| | new dual pane windows | new paint, dual pane windows # all new dual pane windows # | dual pane windows ǀ anderson windows ǀ new windows ǀ hvac an |
| | new pane windows | new paint, dual pane windows # all new dual pane windows # new dual pane windows # new triple pane windows | dual pane windows ǀ anderson windows ǀ new windows ǀ hvac an |
| | triple pane windows | new triple pane windows # | dual pane windows ǀ anderson windows ǀ new windows ǀ hvac an |

FIG. 20

AUTOMATED BUILDING OF EXPANDED DATASETS FOR TRAINING OF AUTONOMOUS AGENTS

CROSS-REFERENCES TO RELATED APPLICATIONS

This application claims the benefit of U.S. Provisional Application No. 62/678,111, filed May 30, 2018, which is incorporated by reference in its entirety.

TECHNICAL FIELD

This disclosure is generally concerned with linguistics. More specifically, this disclosure relates to training intent classifiers with improved training data sets.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users.

Autonomous often use models such as classifiers. But because these models are trained, they are somewhat dependent on a quality level of training data used for training. For example, while statistical and deep learning language systems often provide superior results as compared to other solutions, extending successful cases and associated training data sets to cover corner cases remains a challenge. Hence, solutions are needed to improve the quality of the training data used to train these models.

BRIEF SUMMARY

Generally, systems, devices, and methods of the present invention are related to using parse thickets to generalize text and improve the quality of training data for classification models. In an example, a training application accesses two fragments of text. The application represents each fragment of text as a parse thicket. The parse thickets jointly represent syntactic and discourse information. From the parse thickets, the application generalizes the text by identifying common entities or common rhetorical relations between parse thickets. The generalized text is added to a training data set, thereby increasing the quality of the training set.

In an example, a method for extending a training data set for a classification model constructs, for a first body of text including fragments, a first syntactic tree and a first discourse tree. The method constructs, for a second body of text including fragments, a second syntactic tree and a second discourse tree. Each discourse tree includes terminal nodes and nonterminal nodes. Each terminal node is associated with one of the fragments of the respective body of text and each nonterminal node represents a rhetorical relationship between two of the fragments. The method merges the first syntactic tree and the first discourse tree into a first parse thicket. The method merges the second syntactic tree and the second discourse tree into a second parse thicket. Each parse thicket identifies one or more of the following: (i) two nouns in a different fragment represented by the respective syntactic trees. Each noun represents a common entity, or (ii) an additional rhetorical relation between fragments represented by the respective discourse trees. The method identifies, between the first parse thicket and the second parse thicket, one or more common components. The one or more common components include one or more of (i) a common part of speech, (ii) a common communicative action, (iii) a common rhetorical relation, or (iv) a common verb signature. The method creates a generalized fragment including text that is associated with the one or more common components. The method adds the generalized fragment to a training data set.

In an aspect, the method trains a classification model with the training data set.

In an aspect, the method adds the first body of text and the second body of text to the training data set.

In an aspect, the method identifies that a first domain-specific class from the first parse thicket matches a second-domain specific class from the second parse thicket.

In an aspect, the method accesses a corpus of text, parses the corpus of text into a plurality of fragments; and selects, from the plurality of fragments, the first body of text and the second body of text.

In an aspect, the method translates the generalized fragment into a complete sentence.

In an aspect, the identifying includes applying a trained classification model to the first parse thicket and the second parse thicket and obtaining the one or more common components from the classification model.

In an aspect, the method filters the generalized fragment based on sentiment, type of phrase, or length of phrase.

In an aspect, the method identifies, from the generalized fragment, a head noun phrase including an entity. The method further matches, in a predefined list, the head noun phrase to a class. The method further accesses an additional fragment. The method identifies, from the additional fragment, an additional head noun phrase. The method matches, in the predefined list, the additional head noun phrase to an additional class. The method determines that the class and the additional class form a hierarchy. The method provides the class, the additional fragment, and the additional class to the training data set.

In an aspect, the first body of text represents a first sentence and the second body of text represents a second sentence.

In an aspect, the first body of text represents a first paragraph and the second body of text represents a second paragraph. The first parse thicket includes a first set of additional syntactic trees and the second parse thicket includes a second set of additional syntactic trees.

Aspects described herein can be implemented as methods, systems, and as computer-executable instructions stored on non-transitory computer-readable media.

BRIEF DESCRIPTION OF THE DRAWINGS

FIG. 3 depicts a further example of a discourse tree in accordance with an aspect.

FIG. 20 illustrates examples of hierarchies, in accordance with an aspect.

DETAILED DESCRIPTION

Figure 1:
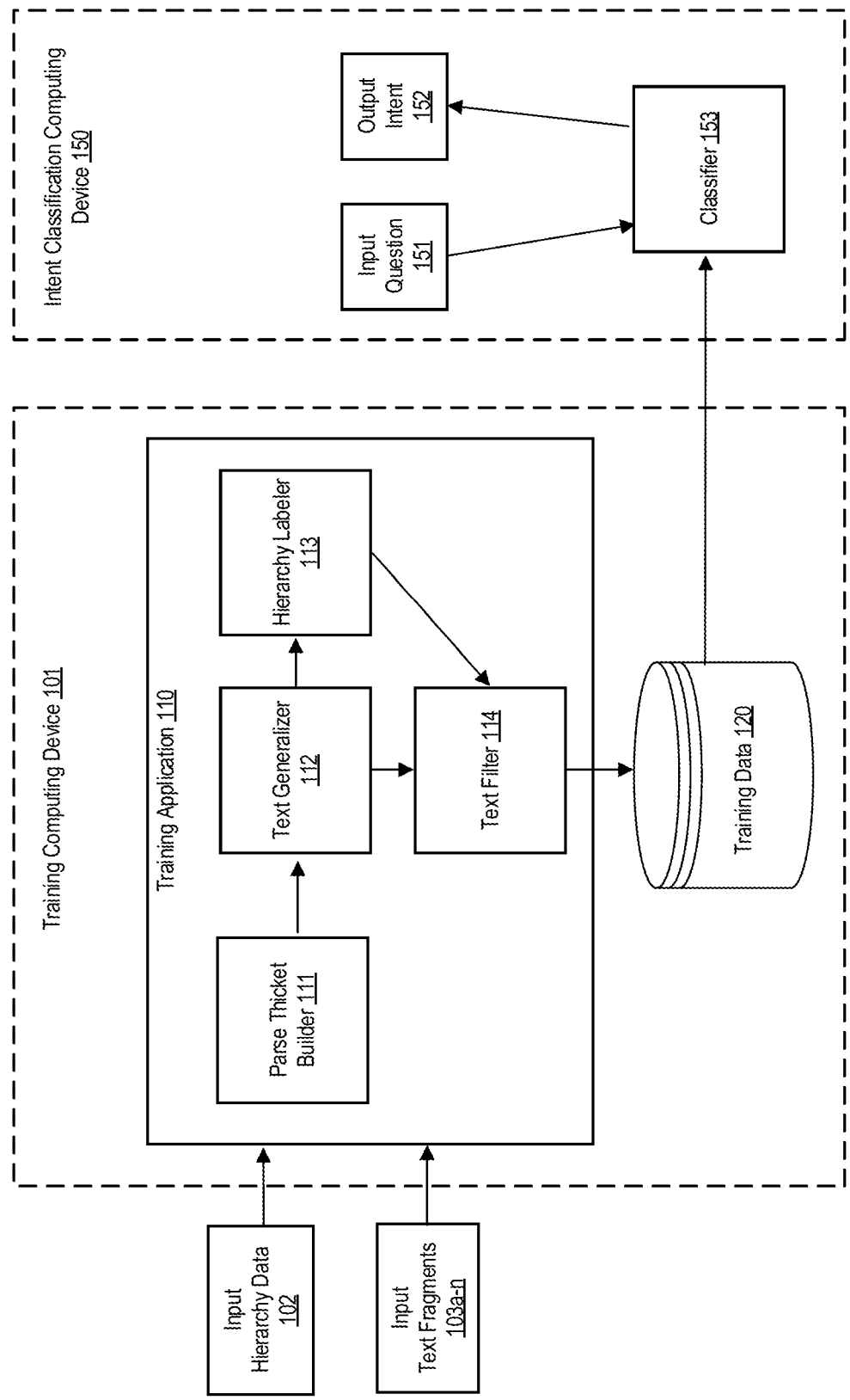
FIG. 1 shows an exemplary rhetoric classification environment, in accordance with an aspect.

Disclosed solutions provide technical improvements to the area of computer-implemented linguistics. As discussed above, classification models can be limited by the quality of training data. Disclosed solutions improve the performance of these models by improving the quality and coverage (e.g., tail phenomena) of training data used to train the models. Therefore, technical advantages of the present disclosure include autonomous agents that are improved relative to traditional approaches.

Certain aspects use parse thickets. A parse thicket is a graph representation of syntactic information of a sentence (optionally represented as a syntactic parse tree) with discourse-level relationships between words and parts of the sentence (optionally represented by a discourse tree). By representing text as one or more parse thickets, disclosed solutions can perform linguistic generalization of the text. Linguistic generalization involves finding commonalities between sentences. Examples of commonalities include common entities, common rhetorical relations, or common communicative actions.

By using generalization, certain aspects increase the number of training data cases, is deterministic, and facilitates explainability and interpretability. When the expanded training set is provided to a statistical or deep learning model, the model can generalize beyond the original training data. Hence, disclosed solutions achieve high recognition accuracy of deep learning and generalization simultaneously with a completeness of the training set delivered by a rule-based, interpretable generalization procedure.

Additionally, in some aspects, disclosed solutions label training data obtained via generalization with domain-specific hierarchical information. In other aspects, disclosed solutions further filter training data to further improve the quality of the training data and therefore the quality of the resulting model.

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, a "communicative discourse trees" or a "CDT" is a discourse tree that is supplemented with communicative actions. A communicative action is a cooperative action undertaken by individuals based on mutual deliberation and argumentation. Communicative discourse trees therefore combine rhetoric information with communicative actions.

As used herein, "communicative verb" is a verb that indicates communication. For example, the verb "deny" is a communicative verb.

As used herein, "communicative action" describes an action performed by one or more agents and the subjects of the agents.

As used herein, an "entity" has an independent and distinct existence. Examples includes objects, places, and persons. An entity can also be a subject or topic such as "electric cars," "brakes," or "France."

Turning now to the Figures, FIG. 1 shows an exemplary rhetoric classification environment, in accordance with an aspect. FIG. 1 depicts input hierarchy data 102, input text fragments 103a-n, training computing device 101, and intent classification computing device 150. In an example, training computing device 101 receives input text fragments 103a-n and input hierarchy data 102 and develops a set of training data used by intent classification computing device 150.

Training computing device 101 includes training application 110 and training data 120. Training application 110 includes one or more components such as parse thicket builder 111, text generalizer 112, hierarchy labeler 113, and text filter 114. Training data 120 includes one or more training data pairs. Each pair can include a training element, a reference prediction or classification, and an associated label (or class).

Training data 120 can be used to train one more models. Examples of models are predictive models and classifiers. Training application 110 can use various sources of texts such as conversational logs from human support agents, Frequently-asked-question (FAQ) pages, user manuals, and instructions as data sources for training data 120.

Examples of use cases for the trained classifiers include autonomous agents. These agents can be packaged in a platform that offers development of question-answers and transactional autonomous agents. Developers can use these platforms to build agents that incorporate domain-specific knowledge.

Parse thicket builder 111 receives input text fragments 103a-n and creates a parse thicket that represents the two or more of the input text fragments 103a-n. The resulting parse thicket includes semantic and rhetorical information for the text fragments, which enables text generalizer 112 to determine commonalities between the text fragments.

More specifically, text generalizer 112 analyzes the parse thicket generated by parse thicket builder 111 to determine commonalities such as common rhetorical relations, common parts of speech, or common communicative actions. Text generalizer 112 outputs generalized text which can include a sentence or a fragment of a sentence containing the commonality of the parse thicket.

Hierarchy labeler 113 accesses input hierarchy data 102, which can be domain-specific. For example, input hierarchy data 102 can relate to a particular domain such as finance or home improvement. Using the example of home improvement, hierarchical data might include categories such as "kitchens," or "cabinet doors," where the latter is a sub-category of the former. Hierarchy labeler 113 can label fragments or sentences within training data 120.

Text filter 114 can perform one or more functions on the generalized text from text generalizer 112. Examples include filtering for a particular sentiment (e.g. positive or negative), constraining the generalized text to a specific length, filtering out various parts of speech or prohibited words.

The generalized text is added into training data 120, which can be further refined or augmented, for example, by repeating the processes described herein. Training data 120 can be used by intent classification computing device 150 or training application 110 to train classifier 153.

When trained, classifier 153 can be used by, intent classification computing device 150 to answer questions received from a user device or to determine a user's intent based. For example, intent classification computing device 150 receives input question 151 from a user device. Intent classification computing device 150 applies classifier 153 to the input question 151 and receives output intent 152 from classifier 153. Examples of output intent 152 include whether a user wants to ask a question or perform an action.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible.

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

| Relation Name | Span | Other Span |
| --- | --- | --- |
| Contrast | One alternate | The other alternate |
| Joint | (unconstrained) | (unconstrained) |
| List | An item | A next item |
| Sequence | An item | A next item |

Figure 2:
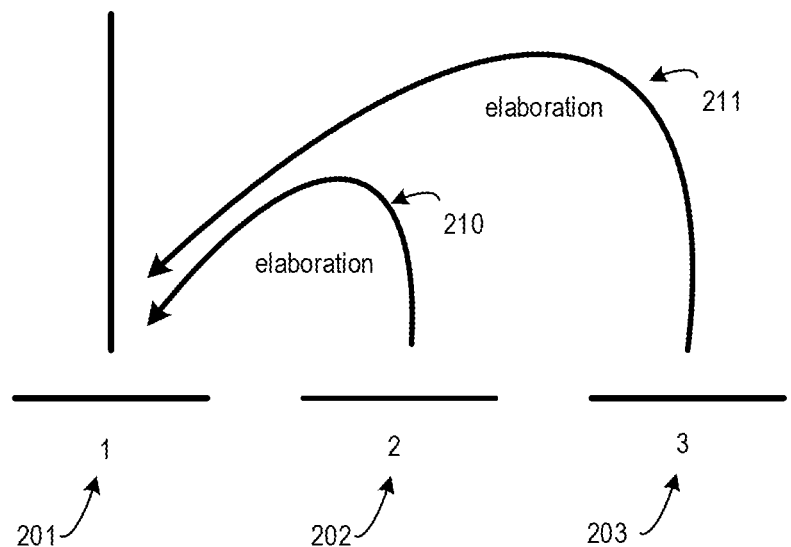
FIG. 2 depicts an example of a discourse tree in accordance with an aspect.

FIG. 2 depicts an example of a discourse tree, in accordance with an aspect. FIG. 2 includes discourse tree 200. Discourse tree includes text span 201, text span 202, text span 203, relation 210 and relation 228. The numbers in FIG. 2 correspond to the three text spans. FIG. 3 corresponds to the following example text with three text spans numbered 1, 2, 3:

1. Honolulu, Hi. will be site of the 2017 Conference on Hawaiian History
2. It is expected that 200 historians from the U.S. and Asia will attend
3. The conference will be concerned with how the Polynesians sailed to Hawaii For example, relation 210, or elaboration, describes the relationship between text span 201 and text span 202. Relation 228 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 328. Relation 310 depicts the relationship enablement, between components 306 and 305, and 307, and 305. FIG. 3 refers to the following text spans:

1. The new Tech Report abstracts are now in the journal area of the library near the abridged dictionary.

2. Please sign your name by any means that you would be interested in seeing.

3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
 (a) Unit size may vary, depending on the goals of the analysis
 (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
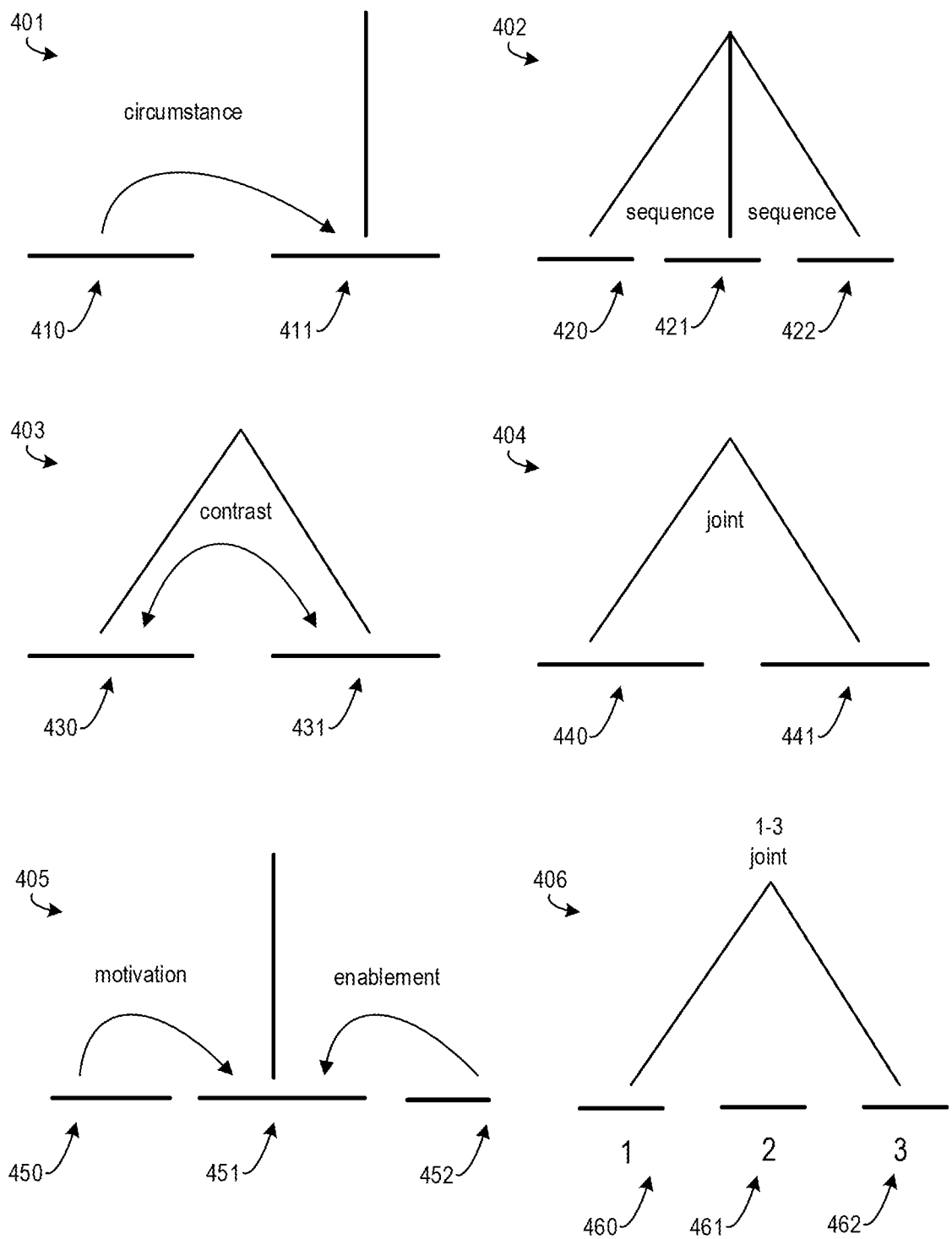
FIG. 4 depicts illustrative schemas, in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas, in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.

2. It will be more humid, with temperatures in the middle 80's.

3. Tonight will be mostly cloudy, with the low temperature between 65 and 70.

While FIGS. 2-4 depict some graphical representations of a discourse tree, other representations are possible.

Figure 5:
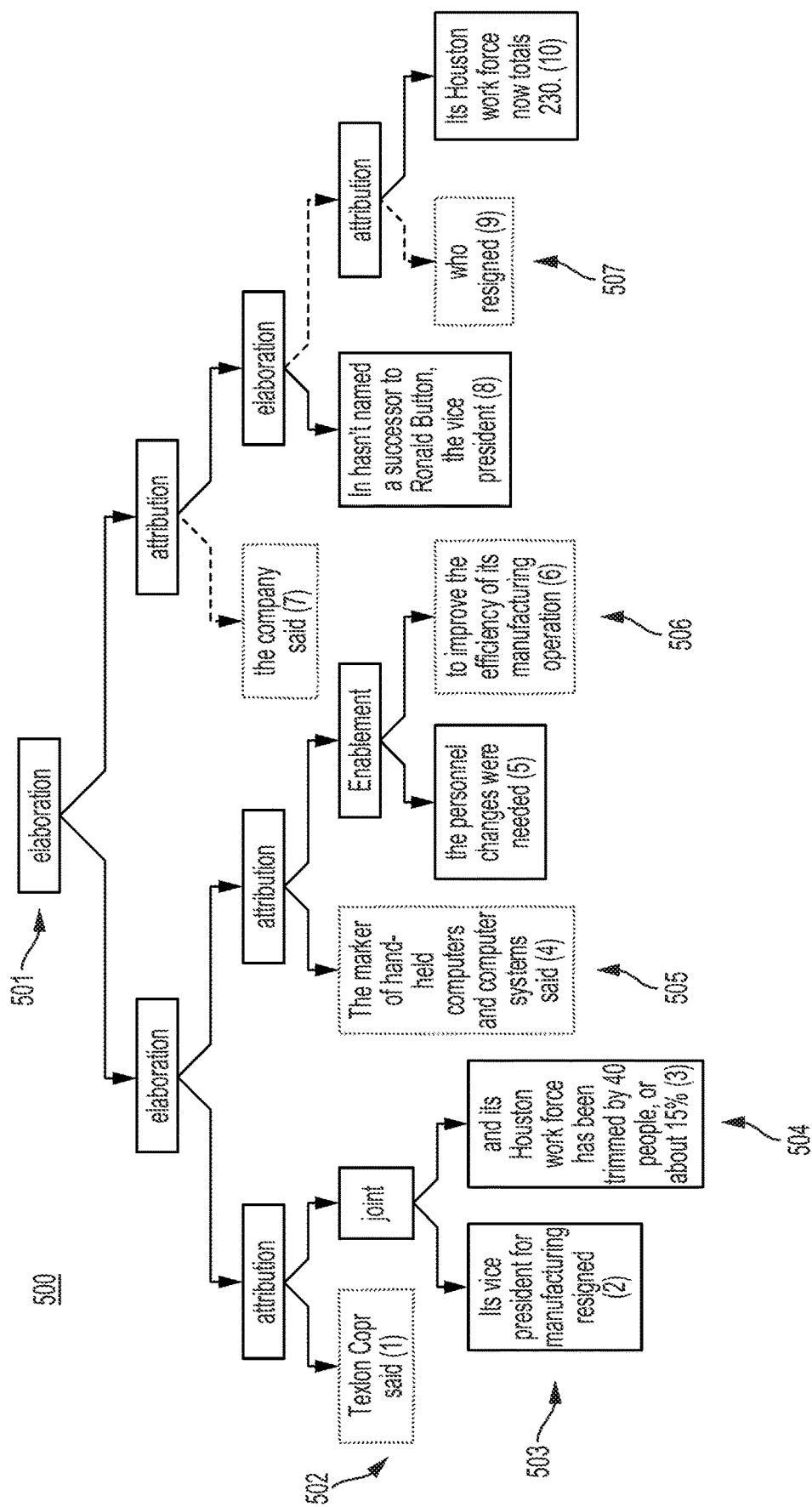
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra- and multi-sentential rhetorical parsing for document-level discourse analysis. In ACL (1), pages 486-496.

Figure 6:
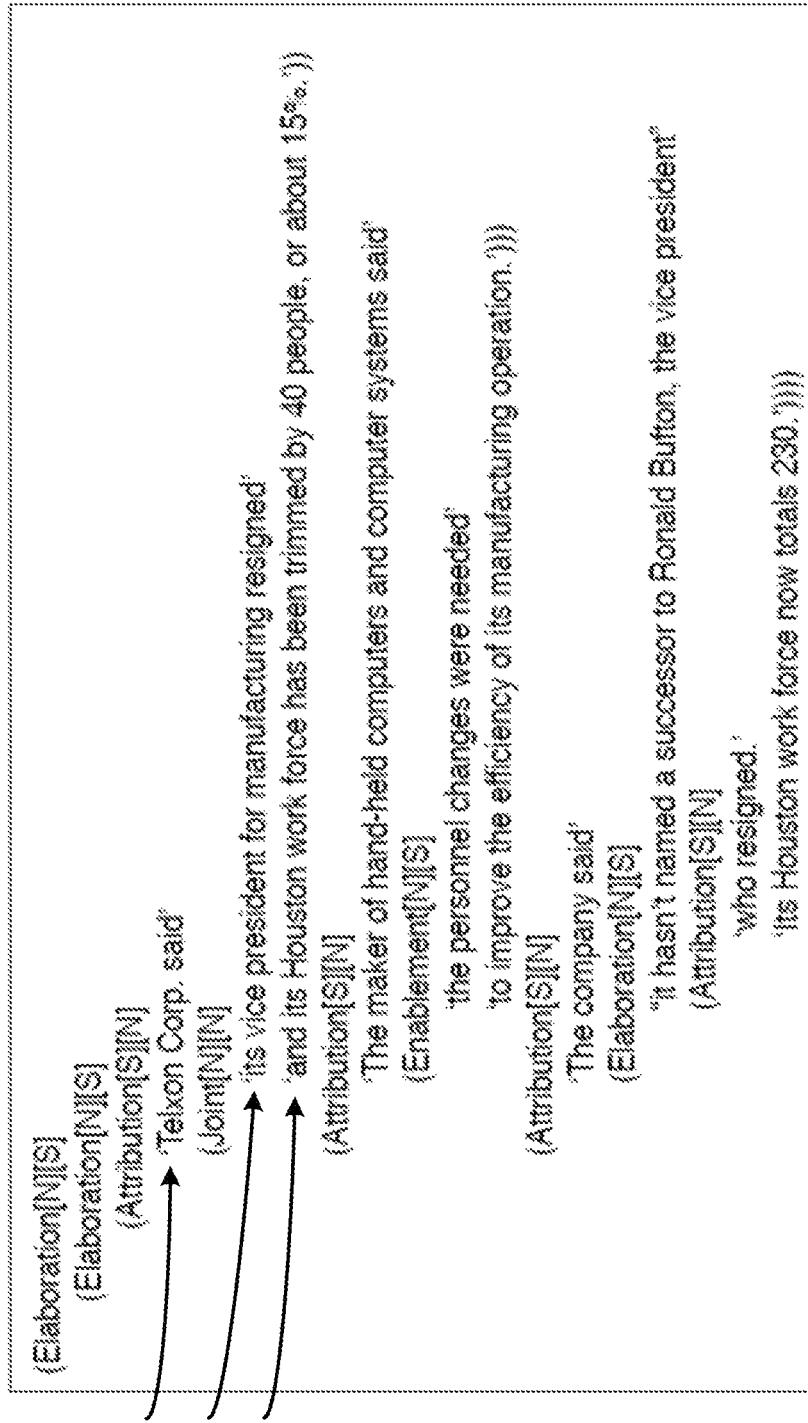
FIG. 6 depicts an exemplary indented text encoding of the representation in FIG. 5 in accordance with an aspect.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is 5/8 while its recall is 5/12. When a search engine returns 30 pages only 20 of which were relevant while failing to return 40 additional relevant pages, its precision is 20/30=2/3 while its recall is 20/60=1/3. Therefore, in this case, precision is 'how useful the search results are', and recall is 'how complete the results are.'" The F1 score (also F-score or F-measure) is a measure of a test's accuracy. It considers both the precision and the recall of the test to compute the score: $F1=2\times((\text{precision}\times\text{recall})/(\text{precision}+\text{recall}))$ and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as FaceBook® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turing test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialog between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work, for e.g. check balance, transfer money and track spending are all "use cases" that the chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publically/privately available data sources.

Communicative Discourse Trees and the Rhetoric Classifier

Aspects of the present disclosure build communicative discourse trees and use communicative discourse trees to analyze whether the rhetorical structure of a request or question agrees with an answer. More specifically, aspects described herein create representations of a request-response pair, learns the representations, and relates the pairs into classes of valid or invalid pairs. In this manner, an autonomous agent can receive a question from a user, process the question, for example, by searching for multiple answers, determine the best answer from the answers, and provide the answer to the user.

More specifically, to represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize valid request-response pairs. To do so, aspects correlate the syntactic structure of a question with that of an answer. By using the structure, a better answer can be determined.

For example, when an autonomous agent receives an indication from a person that the person desires to sell an item with certain features, the autonomous agent should provide a search result that not only contains the features but also indicates an intent to buy. In this manner, the autonomous agent has determined the user's intent. Similarly, when an autonomous agent receives a request from a person to share knowledge about a particular item, the search result should contain an intent to receive a recommendation. When a person asks an autonomous agent for an opinion about a subject, the autonomous agent shares an opinion about the subject, rather than soliciting another opinion.

Analyzing Request and Response Pairs

Figure 7:
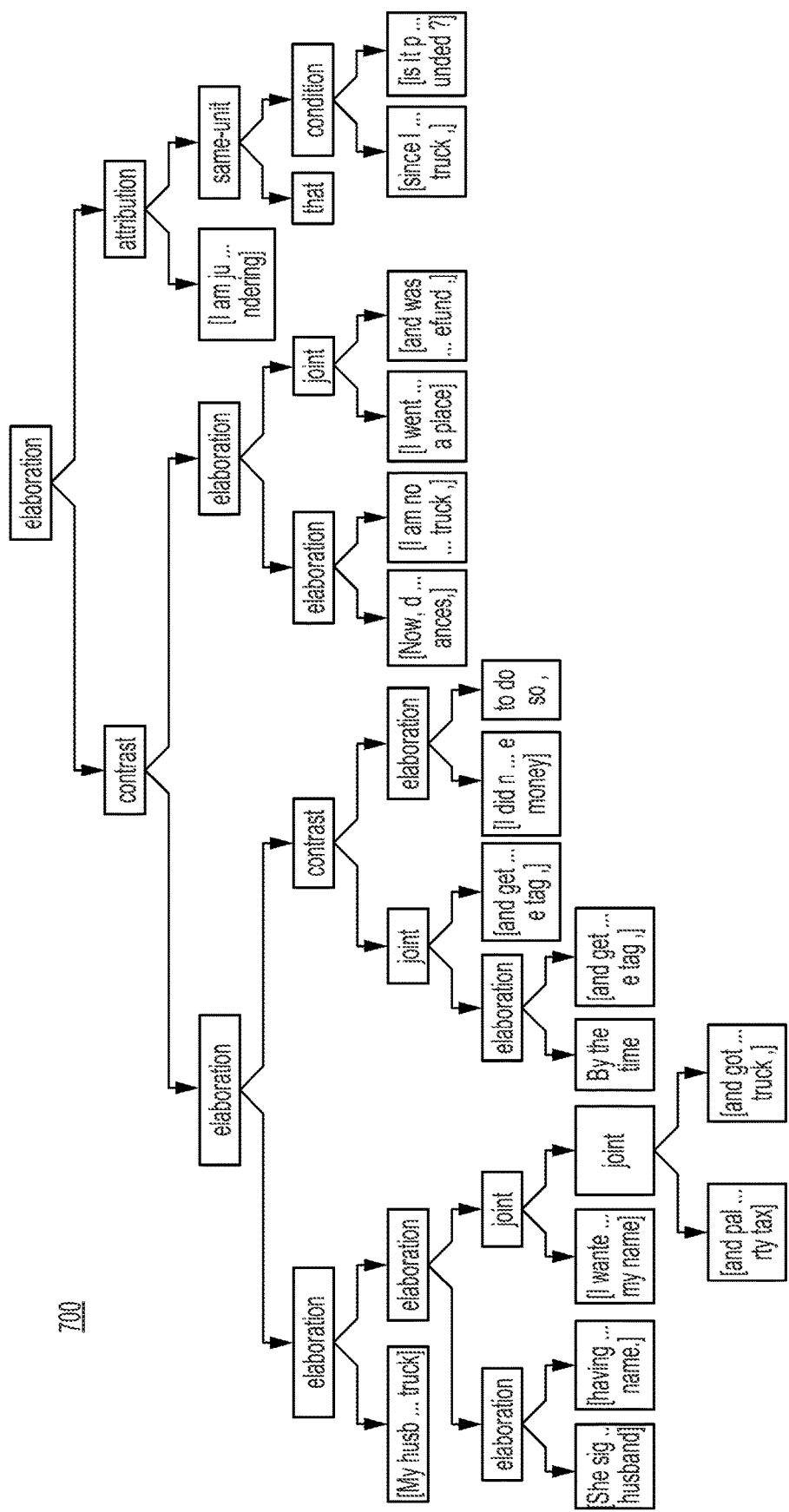
FIG. 7 depicts an exemplary DT for an example request about property tax in accordance with an aspect.

FIG. 7 depicts an exemplary DT for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with

"By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
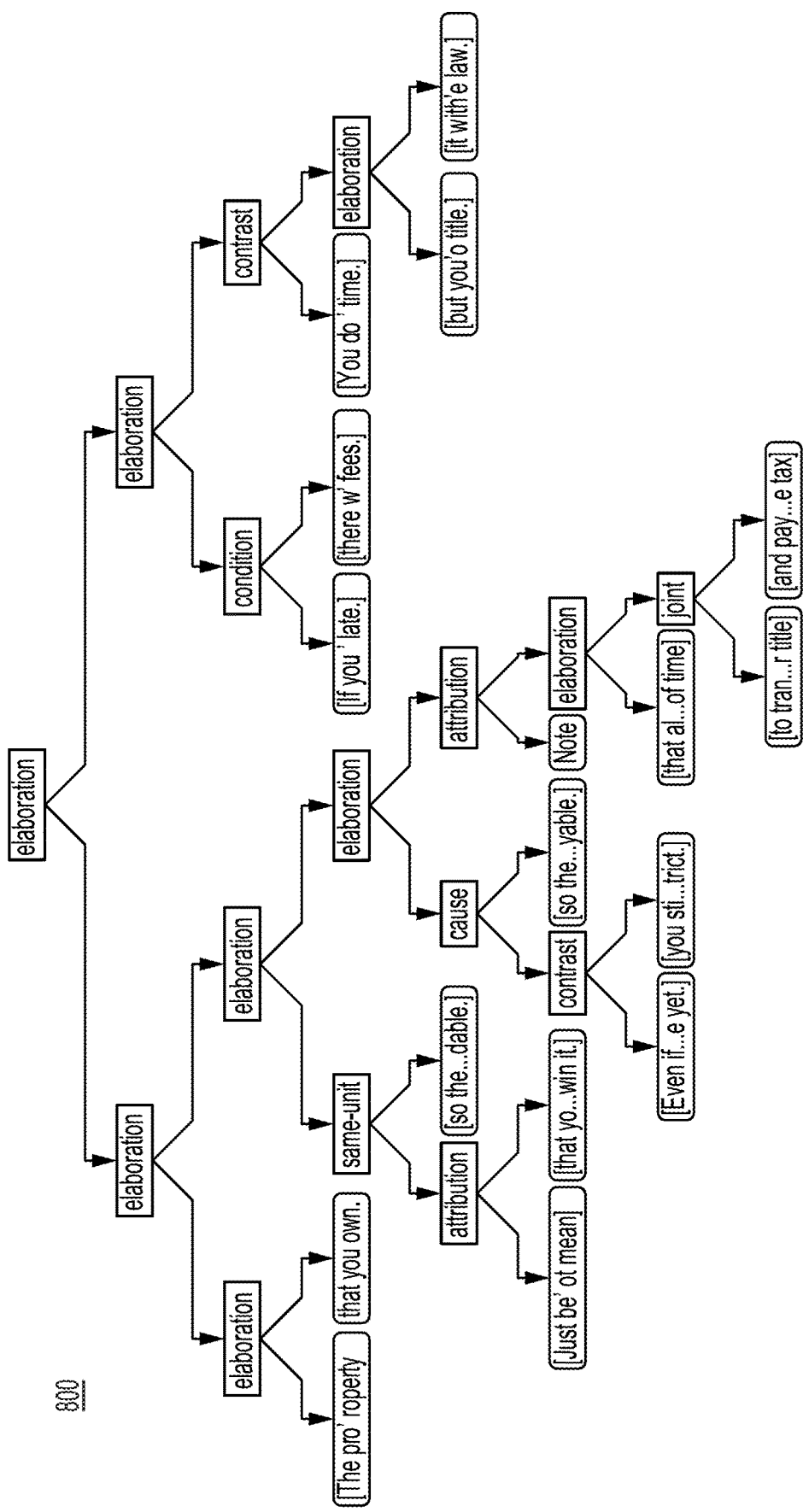
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
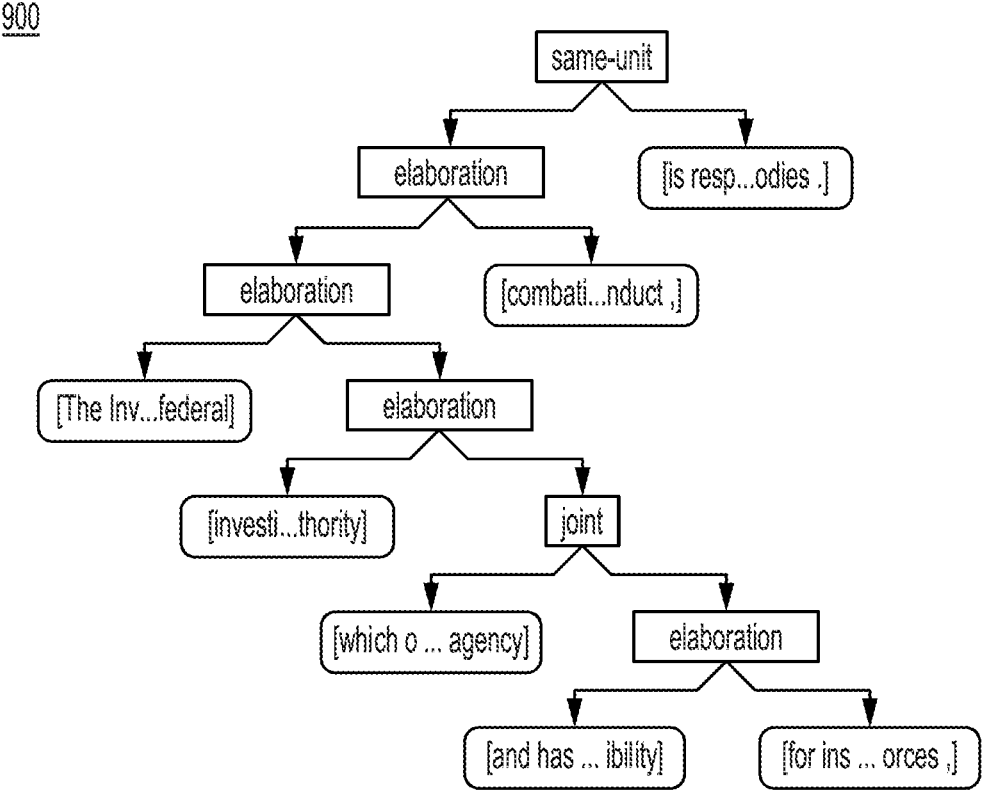
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
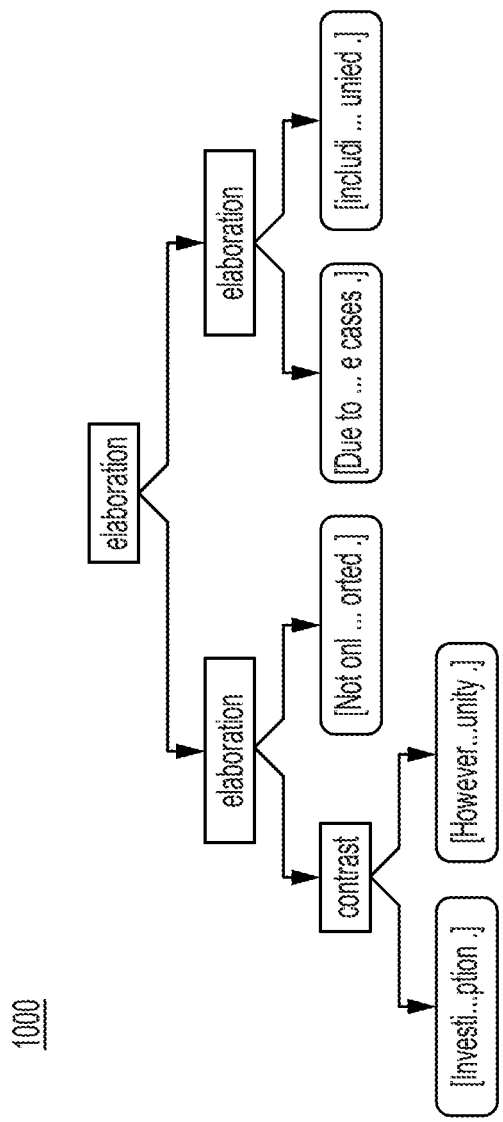
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers. (See FIG. 9 and FIG. 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Classification of Request-Response Pairs

Training application 110 can determine whether a given answer or response, such as an answer obtained from an answer database or a public database, is responsive to a given question, or request. More specifically, training application 110 analyzes whether a request and response pair is correct or incorrect by determining one or both of (i) relevance or (ii) rhetoric agreement between the request and the response. Rhetoric agreement can be analyzed without taking into account relevance, which can be treated orthogonally.

Training application 110 can determine similarity between question-answer pairs using different methods. For example, training application 110 can determine level of similarity between an individual question and an individual answer. Alternatively, training application 110 can determine a measure of similarity between a first pair including a question and an answer, and a second pair including a question and answer.

For example, training application 110 uses classifier 153 trained to predict matching or non-matching answers. Training application 110 can process two pairs at a time, for example <q1, a1> and <q2, a2>. Training application 110 compares q1 with q2 and a1 with a1, producing a combined similarity score. Such a comparison allows a determination of whether an unknown question/answer pair contains a correct answer or not by assessing a distance from another question/answer pair with a known label. In particular, an unlabeled pair <q2, a2> can be processed so that rather than "guessing" correctness based on words or structures shared by q2 and a2, both q2 and a2 can be compared with their corresponding components q1 and a2 of the labeled pair <q2, a2> on the grounds of such words or structures. Because this approach targets a domain-independent classification of an answer, only the structural cohesiveness between a question and answer can be leveraged, not 'meanings' of answers.

In an aspect, training application 110 uses training data 120 to train classifier 153. In this manner, classifier 153 is trained to determine a similarity between pairs of questions and answers. This is a classification problem. Training data 120 can include a positive training set and a negative training set. Training data 120 includes matching request-response pairs in a positive dataset and arbitrary or lower relevance or appropriateness request-response pairs in a negative dataset. For the positive dataset, various domains with distinct acceptance criteria are selected that indicate whether an answer or response is suitable for the question.

Each training data set includes a set of training pairs. Each training set includes a question communicative discourse tree that represents a question and an answer communicative discourse tree that represents an answer and an expected level of complementarity between the question and answer. By using an iterative process, training application 110 provides a training pair to classifier 153 and receives, from the model, a level of complementarity. Training application 110 calculates a loss function by determining a difference between the determined level of complementarity and an expected level of complementarity for the particular training pair. Based on the loss function, training application 110 adjusts internal parameters of the classification model to minimize the loss function.

Acceptance criteria can vary by application. For example, acceptance criteria may be low for community question answering, automated question answering, automated and manual customer support systems, social network communications and writing by individuals such as consumers about their experience with products, such as reviews and complaints. RR acceptance criteria may be high in scientific texts, professional journalism, health and legal documents in the form of FAQ, professional social networks such as "stackoverflow."

Communicative Discourse Trees (CDTs)

Training application 110 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. See Galitsky, B, Ilvovsky, D. and Kuznetsov S O. Rhetoric Map of an Answer to Compound Queries Knowledge Trail Inc. ACL 2015, 681-686. ("Galitsky 2015").

In an example, a dispute between three parties concerning the causes of a downing of a commercial airliner, Malaysia Airlines Flight 17 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
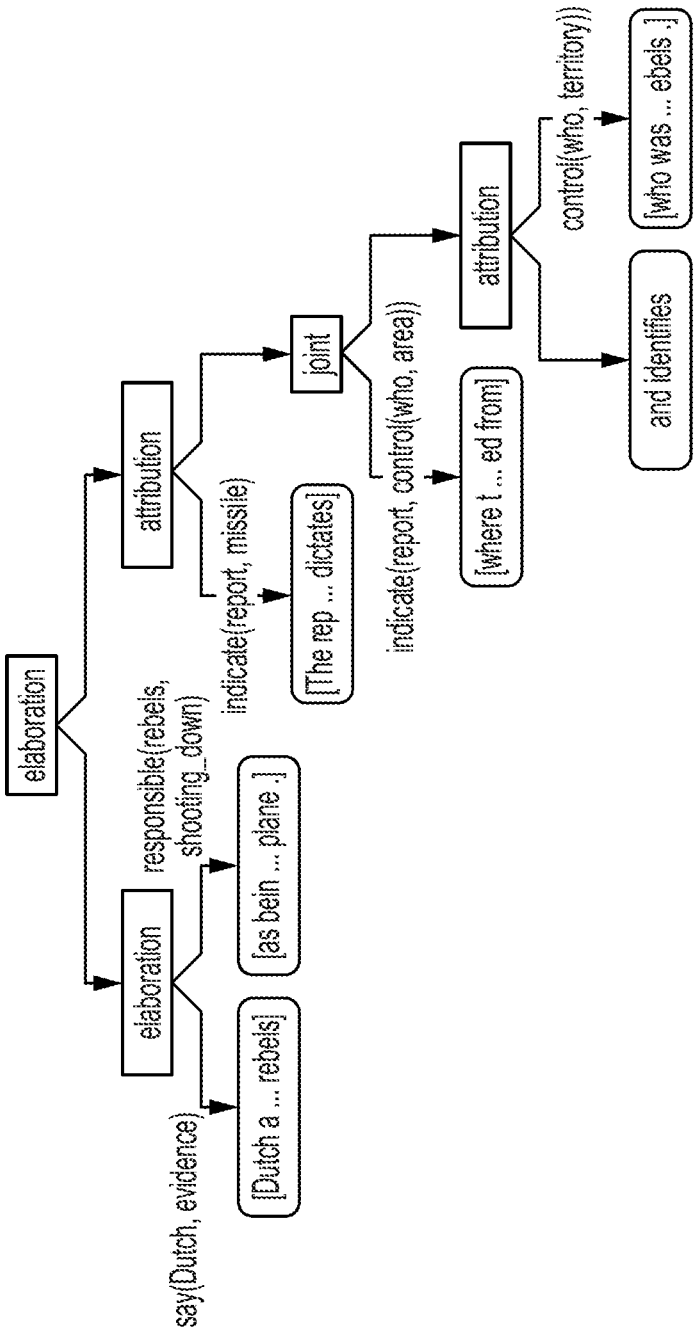
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 100, which represents the following text: "Dutch accident investigators say that evidence points to pro-Russian rebels as being responsible for shooting down plane. The report indicates where the missile was fired from and identifies who was in control of the territory and pins the downing of MH17 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible (rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet. See Karin Kipper, Anna Korhonen, Neville Ryant, Martha Palmer, A Large-scale Classification of English Verbs, Language Resources and Evaluation Journal, 42(1), pp. 21-40, Springer Netherland, 2008. and/or Karin Kipper Schuler, Anna Korhonen, Susan W. Brown, VerbNet overview, extensions, mappings and apps, Tutorial, NAACL-HLT 2009, Boulder, Colo.

Figure 12:
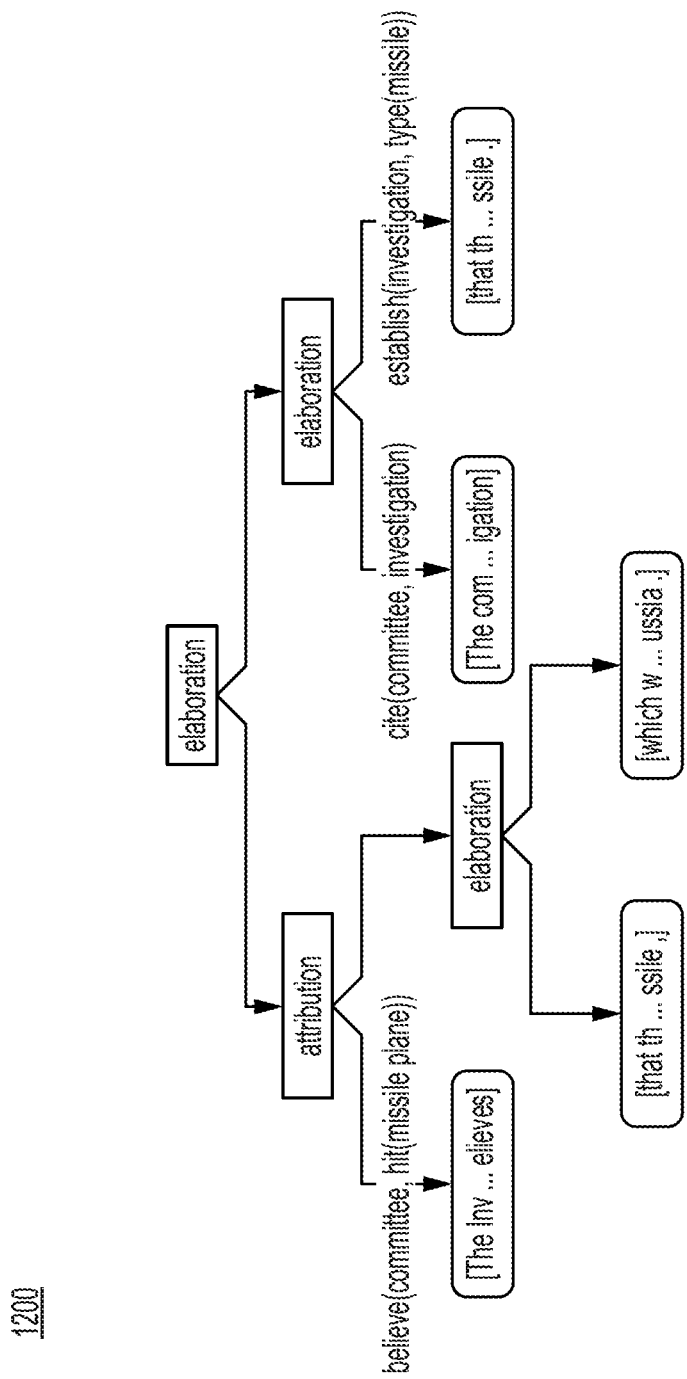
FIG. 12 illustrates a communicative discourse tree for a claim of a second agent in accordance with an aspect.

FIG. 12 illustrates a communicative discourse tree for a claim of a second agent in accordance with an aspect. FIG. 12 depicts communicative discourse tree 1200, which represents the following text: "The Investigative Committee of the Russian Federation believes that the plane was hit by a missile, which was not produced in Russia. The committee cites an investigation that established the type of the missile."

Figure 13:
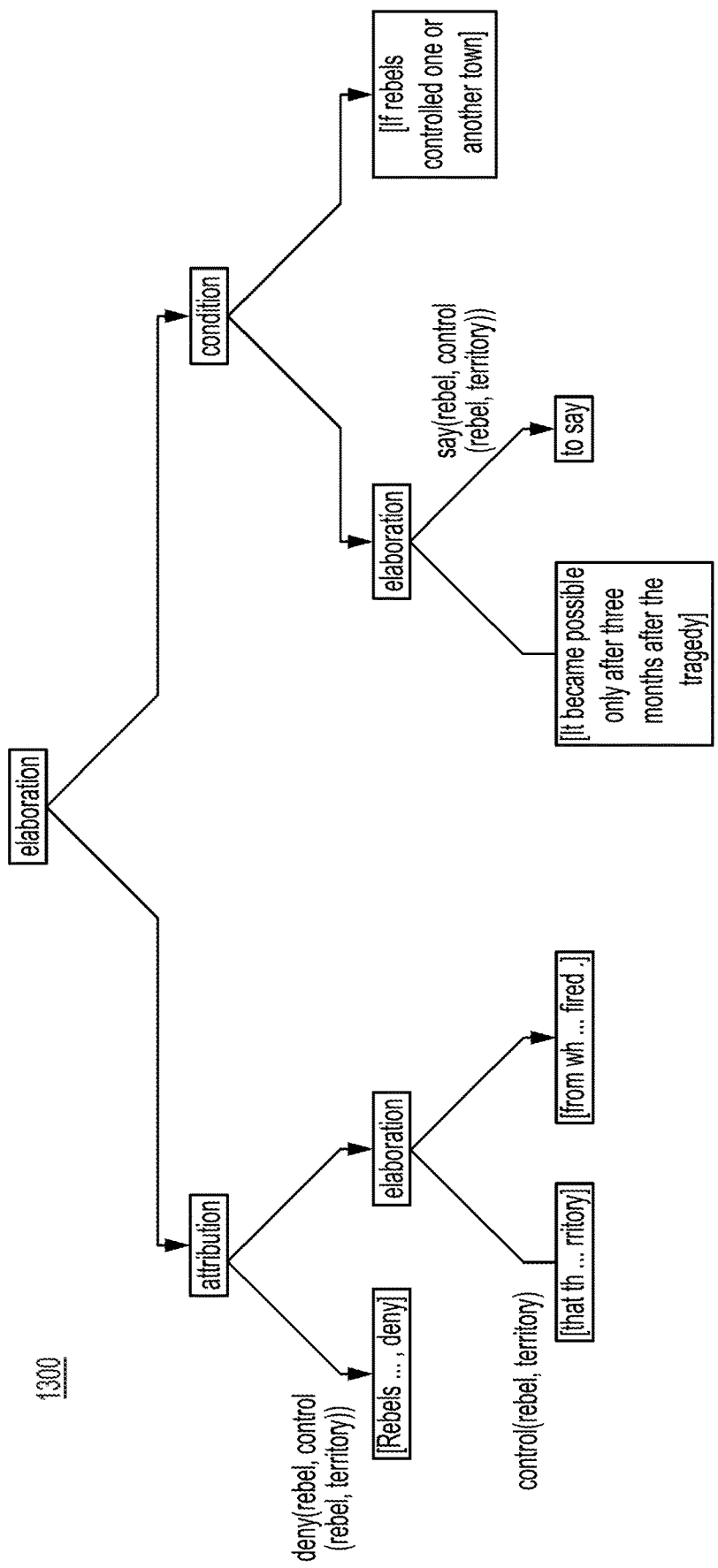
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1200 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents have to follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-tree. Expressing similarity as a maximal common sub-tree is referred to as generalization:

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, *Language Resources and Evaluation*, Vol. 42, No. 1 (March 2008), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse(Stimulus, E, Emotion, Experiencer), cause(Stimulus, E), emotional_state(result(E), Emotion, Experiencer).

NP V ADV-Middle. Example: "Small children amuse quickly." Syntax: Experiencer V ADV. Clause: amuse(Experiencer, Prop):-, property(Experiencer, Prop), adv(Prop).

NP V NP-PRO-ARB. Example "The teacher amused." Syntax Stimulus V. amuse(Stimulus, E, Emotion, Experiencer): cause(Stimulus, E), emotional_state(result(E), Emotion, Experiencer).

NP.cause V NP. Example "The teacher's dolls amused the children." syntax Stimulus <+genitive> ('s) V Experiencer. amuse(Stimulus, E, Emotion, Experiencer): cause(Stimulus, E), emotional_state(during(E), Emotion, Experiencer).

NP V NP ADJ. Example "This performance bored me totally." syntax Stimulus V Experiencer Result. amuse(Stimulus, E, Emotion, Experiencer). cause(Stimulus, E), emotional_state(result(E), Emotion, Experiencer), Pred(result(E), Experiencer).

Communicative actions can be characterized into clusters, for example:
Verbs with Predicative Complements (Appoint, characterize, dub, declare, conjecture, masquerade, orphan, captain, consider, classify), Verbs of Perception (See, sight, peer).
Verbs of Psychological State (Amuse, admire, marvel, appeal), Verbs of Desire (Want, long).
Judgment Verbs (Judgment), Verbs of Assessment (Assess, estimate), Verbs of Searching (Hunt, search, stalk, investigate, rummage, ferret), Verbs of Social Interaction (Correspond, many, meet, battle), Verbs of Communication (Transfer(message), inquire, interrogate, tell, manner(speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.

Representing Request-Response Pairs

Representing request-response pairs facilitates classification based operations based on a pair. In an example, request-response pairs can be represented as parse thickets. A parse thicket is a representation of parse trees for two or more sentences with discourse-level relationships between words and parts of the sentence in one graph. See Galitsky 2015. Topical similarity between question and answer can expressed as common sub-graphs (or sub-trees) of parse thickets. The higher the number of common graph nodes, the higher the similarity.

Figure 14:
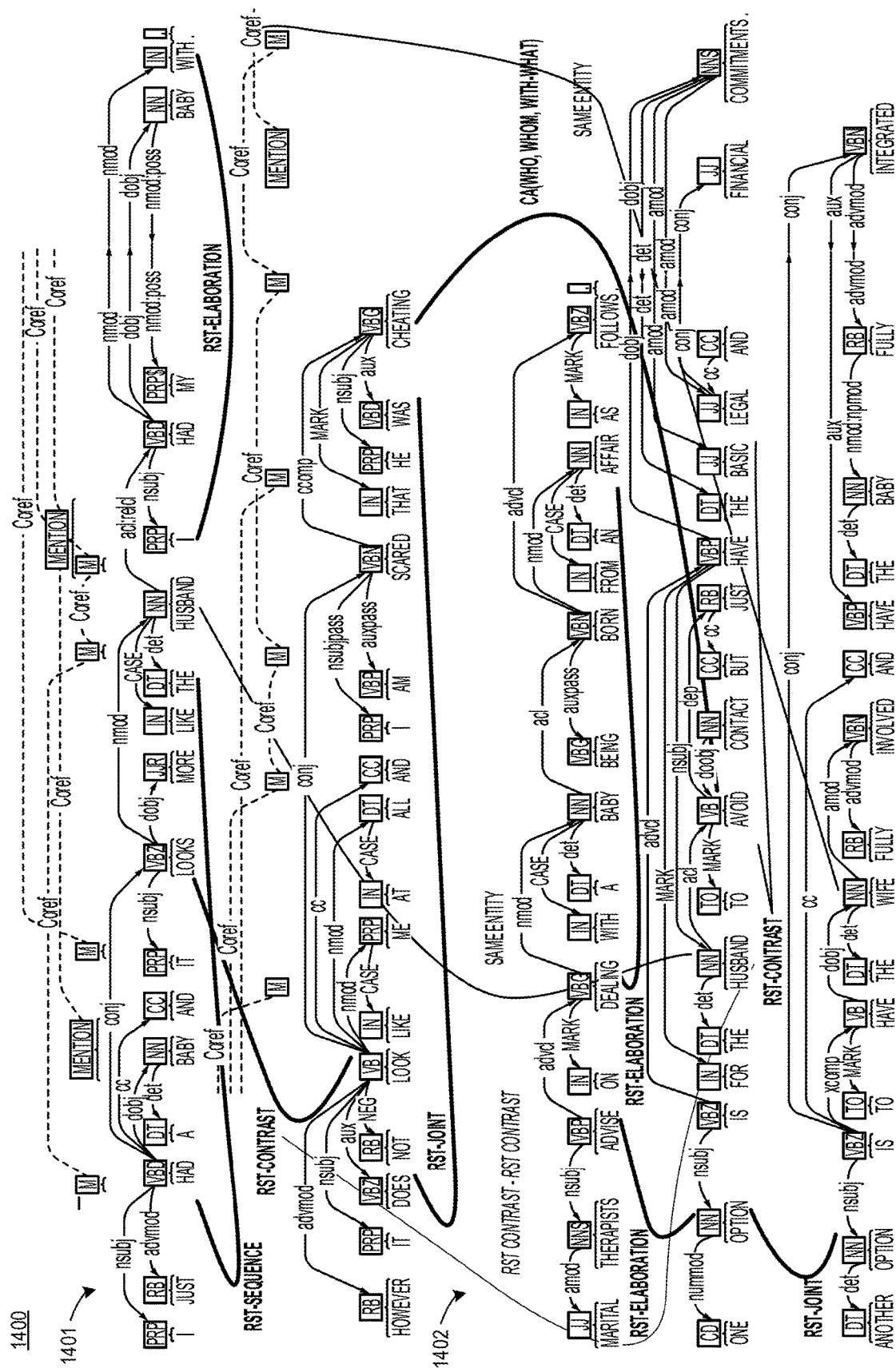
FIG. 14 illustrates parse thickets in accordance with an aspect.

FIG. 14 illustrates parse thickets in accordance with an aspect. FIG. 14 depicts parse thicket 1400 including a parse tree 1401 for a request, and a parse tree for a corresponding response 1402.

Parse tree 1401 represents the question "I just had a baby and it looks more like the husband I had my baby with. However it does not look like me at all and I am scared that he was cheating on me with another lady and I had her kid. This child is the best thing that has ever happened to me and I cannot imagine giving my baby to the real mom."

Response 1402 represents the response "Marital therapists advise on dealing with a child being born from an affair as follows. One option is for the husband to avoid contact but just have the basic legal and financial commitments. Another option is to have the wife fully involved and have the baby fully integrated into the family just like a child from a previous marriage."

FIG. 14 represents a greedy approach to representing linguistic information about a paragraph of text. The straight edges of this graph are syntactic relations, and curvy arcs are discourse relations, such as anaphora, same entity, sub-entity, rhetoric relation and communicative actions. The solid arcs are for same entity/sub-entity/anaphora relations, and the dotted arcs are for rhetoric relations and communicative actions. Oval labels in straight edges denote the syntactic relations. Lemmas are written in the boxes for the nodes, and lemma forms are written on the right side of the nodes.

Parse thicket 1400 includes much richer information than just a combination of parse trees for individual sentences. Navigation through this graph along the edges for syntactic relations as well as arcs for discourse relations allows to transform a given parse thicket into semantically equivalent forms for matching with other parse thickets, performing a text similarity assessment task. To form a complete formal representation of a paragraph, as many links as possible are expressed. Each of the discourse arcs produces a pair of thicket phrases that can be a potential match.

Topical similarity between the seed (request) and response is expressed as common sub-graphs of parse thickets. They are visualized as connected clouds. The higher the number of common graph nodes, the higher the similarity. For rhetoric agreement, common sub-graph does not have to be large as it is in the given text. However, rhetoric relations and communicative actions of the seed and response are correlated and a correspondence is required.

Generalization for Communicative Actions

A similarity between two communicative actions $A_1$ and $A_2$ is defined as a an abstract verb which possesses the features which are common between $A_1$ and $A_2$. Defining a similarity of two verbs as an abstract verb-like structure supports inductive learning tasks, such as a rhetoric agreement assessment. In an example, a similarity between the following two common verbs, agree and disagree, can be generalized as follows: agree^disagree=verb(Interlocutor, Proposed_action, Speaker), where Interlocution is the person who proposed the Proposed_action to the Speaker and to whom the Speaker communicates their response. Proposed_action is an action that the Speaker would perform if they were to accept or refuse the request or offer, and The Speaker is the person to whom a particular action has been proposed and who responds to the request or offer made.

In a further example, a similarity between verbs agree and explain is represented as follows: agree^explain=verb(Interlocutor, *, Speaker). The subjects of communicative actions are generalized in the context of communicative actions and are not be generalized with other "physical" actions. Hence, aspects generalize individual occurrences of communicative actions together with corresponding subjects.

Additionally, sequences of communicative actions representing dialogs can be compared against other such sequences of similar dialogs. In this manner, the meaning of an individual communicative action as well as the dynamic discourse structure of a dialogue is (in contrast to its static structure reflected via rhetoric relations) is represented. A generalization is a compound structural representation that happens at each level. Lemma of a communicative action is generalized with lemma, and its semantic role are generalized with respective semantic role.

Communicative actions are used by text authors to indicate a structure of a dialogue or a conflict. See Searle, J. R. 1969, Speech acts: an essay in the philosophy of language. London: Cambridge University Press. Subjects are generalized in the context of these actions and are not generalized with other "physical" actions. Hence, the individual occurrences of communicative actions together are generalized with their subjects, as well as their pairs, as discourse "steps."

Generalization of communicative actions can also be thought of from the standpoint of matching the verb frames, such as VerbNet. The communicative links reflect the discourse structure associated with participation (or mentioning) of more than a single agent in the text. The links form a sequence connecting the words for communicative actions (either verbs or multi-words implicitly indicating a communicative intent of a person).

Communicative actions include an actor, one or more agents being acted upon, and the phrase describing the features of this action. A communicative action can be described as a function of the form: verb (agent, subject, cause), where verb characterizes some type of interaction between involved agents (e.g., explain, confirm, remind, disagree, deny, etc.), subject refers to the information transmitted or object described, and cause refers to the motivation or explanation for the subject.

A scenario (labeled directed graph) is a sub-graph of a parse thicket G=(V, A), where V={action$_1$, action$_2$ . . . action$_n$} is a finite set of vertices corresponding to communicative actions, and A is a finite set of labeled arcs (ordered pairs of vertices), classified as follows:

Each arc action$_i$, action$_j \in A_{sequence}$ corresponds to a temporal precedence Of two actions $v_i$, ag$_i$, $s_i$, $c_i$ and $v_j$, ag$_j$, $s_j$, $c_j$ that refer to the same subject, e.g., $s_j=s_i$ or different subjects. Each arc action$_i$, action$_j \in A_{cause}$ corresponds to an attack relationship between action$_i$ and action$_j$ indicating that the cause of action$_i$ in conflict with the subject or cause of action$_j$.

Subgraphs of parse thickets associated with scenarios of interaction between agents have some distinguishing features. For example, (1) all vertices are ordered in time, so that there is one incoming arc and one outgoing arc for all vertices (except the initial and terminal vertices), (2) for $A_{sequence}$ arcs, at most one incoming and only one outgoing arc are admissible, and (3) for $A_{cause}$ arcs, there can be many outgoing arcs from a given vertex, as well as many incoming arcs. The vertices involved may be associated with different agents or with the same agent (i.e., when he contradicts himself). To compute similarities between parse thickets and their communicative action, induced subgraphs, the subgraphs of the same configuration with similar labels of arcs and strict correspondence of vertices are analyzed.

The following similarities exist by analyzing the arcs of the communicative actions of a parse thicket: (1) one communicative action from with its subject from T1 against another communicative action with its subject from T2 (communicative action arc is not used), and (2) a pair of communicative actions with their subjects from T1 compared to another pair of communicative actions from T2 (communicative action arcs are used).

Generalizing two different communicative actions is based on their attributes. See (Galitsky et al 2013). As can be seen in the example discussed with respect to FIG. 14, one communicative action from T1, cheating(husband, wife, another lady) can be compared with a second from T2, avoid(husband, contact(husband, another lady)). A generalization results in communicative_action(husband, *) which introduces a constraint on A in the form that if a given agent (=husband) is mentioned as a subject of CA in Q, he(she) should also be a subject of (possibly, another) CA in A. Two communicative actions can always be generalized, which is not the case for their subjects: if their generalization result is empty, the generalization result of communicative actions with these subjects is also empty.

Generalization of RST Relations

Some relations between discourse trees can be generalized, such as arcs that represent the same type of relation (presentation relation, such as antithesis, subject matter relation, such as condition, and multinuclear relation, such as list) can be generalized. A nucleus or a situation presented by a nucleus is indicated by "N." Satellite or situations presented by a satellite, are indicated by "S." "W" indicates a writer. "R" indicates a reader (hearer). Situations are propositions, completed actions or actions in progress, and communicative actions and states (including beliefs, desires, approve, explain, reconcile and others). Generalization of two RST relations with the above parameters is expressed as:

$$rst1(N1,S1,W1,R1)\hat{\ }rst2(N2,S2,W2,R2)=(rst1\hat{\ }rst2)$$
$$(N1\hat{\ }N2,S1\hat{\ }S2,W1\hat{\ }W2,R1\hat{\ }R2).$$

The texts in N1, S1, W1, R1 are subject to generalization as phrases. For example, rst1^rst2 can be generalized as follows: (1) if relation_type(rst1)!=relation_type(rst2) then a generalization is empty. (2) Otherwise, the signatures of rhetoric relations are generalized as sentences: sentence(N1, S1, W1, R1) ^ sentence(N2, S2, W2, R2). See Iruskieta, Mikel, Iria da Cunha and Maite Taboada. A qualitative comparison method for rhetorical structures: identifying different discourse structures in multilingual corpora. Lang Resources & Evaluation. June 2015, Volume 49, Issue 2.

For example, the meaning of rst–background^rst–enablement=(S increases the ability of R to comprehend an element in N)^(R comprehending S increases the ability of R to perform the action in N)=increase-VB the-DT ability-NN of-IN R-NN to-IN.

Because the relations rst–background^rst–enablement differ, the RST relation part is empty. The expressions that are the verbal definitions of respective RST relations are then generalized. For example, for each word or a placeholder for a word such as an agent, this word (with its POS) is retained if the word the same in each input phrase or remove the word if the word is different between these phrases. The resultant expression can be interpreted as a common meaning between the definitions of two different RST relations, obtained formally.

Two arcs between the question and the answer depicted in FIG. 14 show the generalization instance based on the RST relation "RST-contrast". For example, "I just had a baby" is a RST-contrast with "it does not look like me," and related to "husband to avoid contact" which is a RST-contrast with "have the basic legal and financial commitments." As can be seen, the answer need not have to be similar to the verb phrase of the question but the rhetoric structure of the question and answer are similar. Not all phrases in the answer must match phrases in question. For example, the phrases that do not match have certain rhetoric relations with the phrases in the answer which are relevant to phrases in question.

Communicative Discourse Trees

Certain aspects herein can use communicative discourse trees. In an example, training application 110 application accesses a sentence comprising fragments. At least one fragment includes a verb and words and each word includes a role of the words within the fragment, and each fragment is an elementary discourse unit. For example, training application 110 accesses a sentence such as "Rebels, the self-proclaimed Donetsk People's Republic, deny that they controlled the territory from which the missile was allegedly fired" as described with respect to FIG. 13.

Continuing the example, training application 110 determines that the sentence includes several fragments. For example, a first fragment is "rebels . . . deny." A second fragment is "that they controlled the territory." A third fragment is "from which the missile was allegedly fired." Each fragment includes a verb, for example, "deny" for the first fragment and "controlled" for the second fragment. Although, a fragment need not include a verb.

Training application 110 generates a discourse tree that represents rhetorical relationships between the sentence fragments. The discourse tree including nodes, each nonterminal node representing a rhetorical relationship between two of the sentence fragments and each terminal node of the nodes of the discourse tree is associated with one of the sentence fragments.

Continuing the example, training application 110 generates a discourse tree as shown in FIG. 13. For example, the third fragment, "from which the missile was allegedly fired" elaborates on "that they controlled the territory." The second and third fragments together relate to attribution of what happened, i.e., the attack cannot have been the rebels because they do not control the territory.

Training application 110 accesses multiple verb signatures. For example, training application 110 accesses a list of verbs, e.g., from VerbNet. Each verb matches or is related to the verb of the fragment. For example, the for the first fragment, the verb is "deny." Accordingly, training application 110 accesses a list of verb signatures that relate to the verb deny.

As discussed, each verb signature includes the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example "the teacher amused the children" has a different signature from "small children amuse quickly." For the first fragment, the verb "deny," training application 110 accesses a list of frames, or verb signatures for verbs that match "deny." The list is "NP V NP to be NP," "NP V that S" and "NP V NP."

Each verb signature includes thematic roles. A thematic role refers to the role of the verb in the sentence fragment. Training application 110 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic.

Training application 110 determines, for each verb signature of the verb signatures, a number of thematic roles of the respective signature that match a role of a word in the fragment. For the first fragment, training application 110 determines that the verb "deny" has only three roles, "agent", "verb" and "theme."

Training application 110 selects a particular verb signature from the verb signatures based on the particular verb signature having a highest number of matches. For example, referring again to FIG. 13, deny in the first fragment "the rebels deny . . . that they control the territory" is matched to verb signature deny "NP V NP", and "control" is matched to control (rebel, territory). Verb signatures are nested, resulting in a nested signature of "deny(rebel, control(rebel, territory))." In certain cases, communicative discourse trees can be used in place of or addition to parse thickets (e.g., as described with respect to process 1600 of FIG. 16).

Generating Improved Training Data Sets

In an example, two steps are required to form a training dataset for an autonomous agent that learns to predict intent. First, the a set of user intent classes is defined. The intent class corresponds to a given domain-specific action. An example of a domain-specific action is the financial transaction of wiring money. Continuing the example, an intent class can include a number of entities such as amount, date and recipient of a financial transaction.

Once an autonomous agent is integrated into a transactional system such as a personal banking system, a particular transactional request received (e.g., financial system API call) is mapped to an intent class. The intent class is mapped into the API call function, and entities of a request utterance are mapped into parameters of the API call function.

Second, a set of instances (utterances) is formed for a given intent class. This utterances have to be as diverse as possible both in terms of meanings and phrasing. The utterances should be clustered reasonably well and do not constitute an overlap between classes. Good coverage helps ensure a good agent recall. If a certain intent class is missed, an agent will not be able to handle the that particular class of intents. If a certain instance of intent is missed, a user request may be misunderstood. Regardless, in either case, a user will get an impression of a limited understanding capability of the agent. Aspects described herein help ensure that training data has good coverage.

Figure 15:
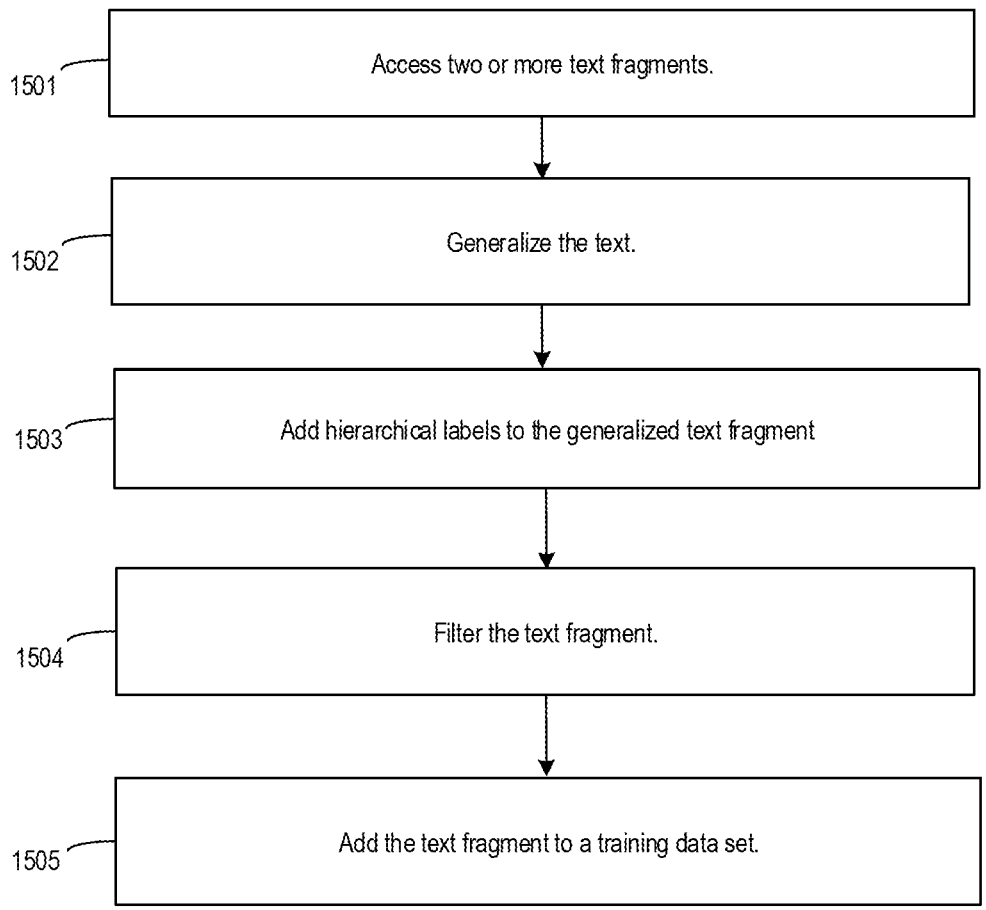
FIG. 15 is a flow chart of a process for generating training data, in accordance with an aspect.

FIG. 15 is a flow chart of a process 1500 for generating training data, in accordance with an aspect. Process 1500 can be implemented by training application 110.

At block 1501, process 1500 involves accessing two or more text fragments. At block 1501, training application 110 accesses a corpus of text. Examples of a corpus of text include user questions, social media posts, and electronic documents. Input text fragments 103a-n are obtained from the corpus of text. Input text fragments 103a-n can be of any size, for example, a text fragment can be a phrase, sentence, paragraph, or multiple paragraphs.

At block 1502, process 1500 involves generalizing the text. Generalization involves identifying one or more commonalities between texts. For example, parse thicket builder 111 builds a parse thicket from the text obtained at block 1501. Text generalizer 112 receives the parse thicket from parse thicket builder 111 and generalizes the text. An example of a process used for generalization is described further with respect to FIG. 16.

At block 1503, process 1500 involves adding hierarchical labels to the generalized text fragment. For example, hierarchy labeler 113 accesses input hierarchy data 102 and appropriately labels the generalized text obtained at block 1502. In some cases, block 1503 is not performed and the text is not labeled.

At block 1504, process 1500 involves filtering the text fragment. For example, text filter 114 applies a filter to part or all of a generalized text fragment before the text fragment is provided to training data 120. In some cases, block 1504 is not performed.

At block 1505, process 1500 involves adding the generalized text fragment to a training data set. For example, training application 110 provides the generalized text fragment to training data 120, which can subsequently be used for training a classification model.

Generalization

Generalization facilitates improved training data by expanding a training data set with data that represents a more general case while optionally maintaining the more specific cases from which the generalized case is obtained. Generalization can include syntactic generalization, discourse generalization, or both.

Figure 16:
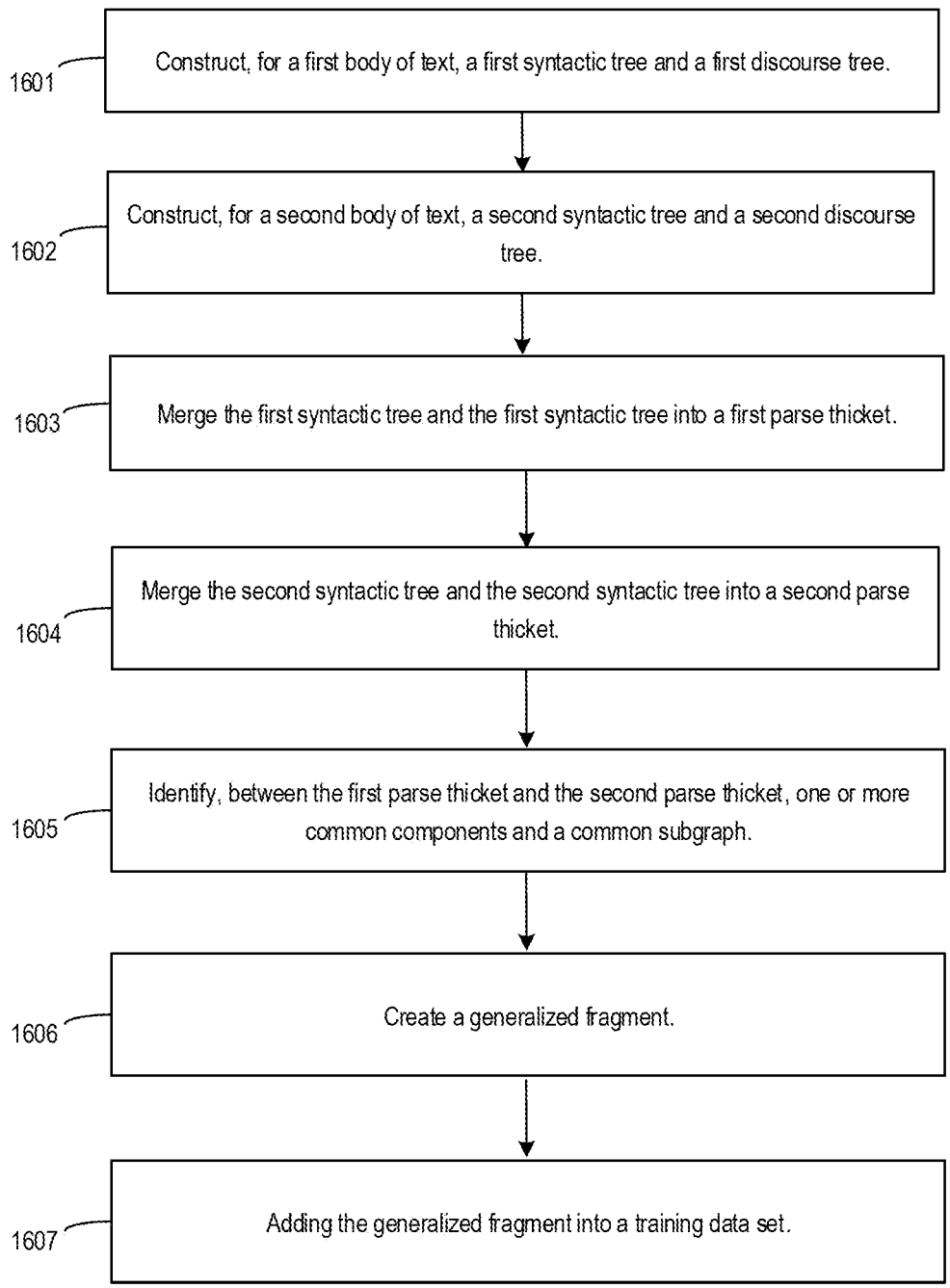
FIG. 16 is a flow chart of a process of generalization, in accordance with an aspect.

FIG. 16 is a flow chart of a process of generalization, in accordance with an aspect. As discussed above, text can be generalized using a syntactic approach, a discourse approach, or both.

At block 1601, process 1600 involves constructing, for a first body of text, a first syntactic tree and a first discourse tree. Training application 110 creates a first syntactic tree and a first discourse tree.

At block 1602, process 1600 involves constructing, for a second body of text, a second syntactic tree and a second discourse tree. Training application 110 creates a second syntactic tree and a second discourse tree.

At block 1603, process 1600 involves merging the first syntactic tree and the first syntactic tree into a first parse thicket. Creating a parse thicket involves identifying one or more of the following: (i) two nouns in a different fragment represented by the respective syntactic trees, where each noun represents a common entity and (ii) an additional rhetorical relation between fragments represented by the respective discourse trees.

At block 1604, process 1600 involves merging the second syntactic tree and the second syntactic tree into a second parse thicket. At block 1604, training application 110 performs similar operations as described with respect to block 1603.

At block 1605, process 1600 involves identifying, between the first parse thicket and the second parse thicket, one or more common components and a common subgraph. This process is referred to as generalization. Examples of common components include (i) a common part of speech, (ii) a common communicative action, (iii) a common rhetorical relation, or (iv) a common verb signature.

Syntactic Generalization

To measure of similarity of abstract entities expressed by logic formulas, a least-general generalization is proposed for a number of machine learning approaches, including explanation based learning and inductive logic programming. Least general generalization was originally introduced by (Plotkin 1970). It is the opposite of most general unification (Robinson 1965) therefore it is also called anti-unification. For two words of the same part of speech (POS), their generalization is the same word with the POS. If the lemmas for the two words are different but the POS is the same, then the POS remains in the result. If lemmas are the same but POS is different, lemma stays in the result. A lemma represents a word without the related part-of-speech information.

To illustrate this concept, consider an example of two natural language expressions. The meanings of the expressions are represented by logic formulas. The unification and anti-unification of these formulas are constructed. Some words (entities) are mapped to predicates, some are mapped into their arguments, and some other words do not explicitly occur in logic form representation but indicate the above instantiation of predicates with arguments.

Consider the following two sentences "camera with digital zoom" and "camera with zoom for beginners." To express the meanings, the following logic predicates are used:
camera(name_of_feature, type_of_users) and
zoom(type_of_zoom).

Note that this is a simplified example, and as such, may have a reduced number of arguments as compared to more typical examples. Continuing the example, the above expressions can be represented as:
camera(zoom(digital), Any User),
camera(zoom(AnyZoom), beginner)

According to the notation, variables (non-instantiated values, not specified in NL expressions) are capitalized. Given the above pair of formulas, unification computes their most general specialization camera(zoom(digital), beginner), and anti-unification computes their most specific generalization, camera(zoom(AnyZoom), Any User).

At the syntactic level, the expressions are subjected to a generalization ('^') of two noun phrases as: {NN-camera, PRP-with, [digital], NN-zoom [for beginners]}. The expressions in square brackets are eliminated because they occur in one expression but not occur in the other. As a result, obtain {NN-camera, PRP-with, NN-zoom]}, which is a syntactic analog of semantic generalization, is obtained.

The purpose of an abstract generalization is to find commonality between portions of text at various semantic levels. Generalization operation occurs on the one or more levels. Examples of levels are paragraph level, sentence level, phrase level, and word level.

At each level (except word-level), individual words, the result of generalization of two expressions is a set of expressions. In such set, for each pair of expressions so that one is less general than other, the latter is eliminated. Generalization of two sets of expressions is a set of sets which are the results of pair-wise generalization of these expressions.

Only a single generalization exists for a pair of words: if words are the same in the same form, the result is a node with this word in this form. To involve word2vec models (Mikolov et al., 2015), compute generalization of two different words, the following rule is used. If subject1=subject2, then subject1^subject2=<subject1, POS (subject1), 1>. Otherwise, if they have the same part-of-speech, subject1^subject2=<*,POS(subject1), word2vecDistance(subject1^subject2)>. If part-of-speech is different, generalization is an empty tuple. It cannot be further generalized.

For a pair of phrases, generalization includes all maximum ordered sets of generalization nodes for words in phrases so that the order of words is retained. In the following example, "To buy digital camera today, on Monday."

"Digital camera was a good buy today, first Monday of the month."

Generalization is {<JJ-digital, NN-camera>,<NN-today, ADV,Monday>}, where the generalization for noun phrases is followed by the generalization for an adverbial phrase. Verb buy is excluded from both generalizations because it occurs in a different order in the above phrases. Buy-digital-camera is not a generalization phrase because buy occurs in different sequence with the other generalization nodes.

Discourse Generalization

At the discourse level, rhetorical relations with elementary discourse units can be generalized as well. Only rhetorical relations of the same class (presentation relation, such as antithesis, subject matter relation, such as condition, and multinuclear relation, such as list) can be generalized. We use N for a nucleus or situations presented by this nucleus, and S for satellite or situations presented by this satellite. Situations are propositions, completed actions or actions in progress, and communicative actions and states (including beliefs, desires, approve, explain, reconcile and others). Hence we have the following expression for Rhetoric Structure Theory (RST, Marcu 2000) based generalization for two texts $text_1$ and $text_2$:

$text_1\,\hat{}\,text_2 = \cup_{i,j}(rstRelation_{1i}, (\ldots, \ldots)\,\hat{}\,rstRelation_{2j} (\ldots, \ldots))$, Where $I \in$(RST relations in texts), $j \in$(RST relations in $text_2$). Further, for a pair of RST relations their generalization looks as follows: $rstRelation_1(N_1, S_1)\,\hat{}\,rstRelation_2 (N_2, S_2) = (rstRelation_1\,\hat{}\,rstRelation_2)(N_1\,\hat{}\,N_2, S_1\,\hat{}\,S_2)$.

The texts in $N_1$, $S_1$ are subject to generalization as phrases. The rules for $rst_1\,\hat{}\,rst_2$ are as follows. If relation_type $(rst_1)$ !=relation_type($rst_2$) then similarity is empty. Otherwise, we generalize the signatures of rhetoric relations as sentences: sentence($N_1$, $S_1$)$\,\hat{}\,$sentence ($N_2$, $S_2$) (Iruskieta et al 2015).

To optimize the calculation of generalization score, weights for particular parts of speech (POS) can help deliver the most accurate similarity measure between sentences possible (Galitsky et al 2012). The problem was formulated as finding optimal weights for nouns, adjectives, verbs and their forms (such as gerund and past tense) such that the resultant search relevance is maximum. Search relevance was measured as a deviation in the order of search results from the best one for a given query (delivered by Google); current search order was determined based on the score of generalization for the given set of POS weights (having other generalization parameters fixed). As a result of this optimization performed in (Galitsky et al 2012), we obtained $W_{NN}=1.0$, $W_{JJ}=0.32$, $W_{RB}=0.71$, $W_{CD}=0.64$, $W_{VB}=0.83$, $W_{PRP}=0.35$ excluding common frequent verbs like get/take/set/put for which $W_{VBcommon}=0.57$. We also set that $W_{<POS,*>}=0.2$ (different words but the same POS), and $W_{<*,word>}=0.3$ (the same word but occurs as different POSs in two sentences).

Generalization score (or similarity between sentences $sent_1$, $sent_2$) then can be expressed as sum through phrases of the weighted sum through words $word_{sent1}$ and $word_{sent2}$ score($sent_1$, $sent_2$)=$\Sigma_{\{NP, VP, \ldots\}} \Sigma\ W_{POS}$ word_gen($word_{sent1}$ $word_{sent2}$). The best generalization can then be defined as the one with the highest score. In this manner, a generalization is defined for phrases, sentences and paragraphs, as well as verb signatures from VerbNet, speech acts, communicative actions, as well rhetorical relations.

Result of generalization can be further generalized with other parse trees or generalization. For a set of sentences, totality of generalizations forms a lattice: order on generalizations is set by the subsumption relation and generalization score (Khardon and Arias. 2006).

In some cases, training application 110 can rank answers according to a relevance score. The relevance score can relate to any level, e.g., word, sentence, or paragraph-level. A set of parse trees for each sentence of the paragraph and the paragraph-level discourse information is used.

In some cases, block 1605 can be implemented by a machine-learning model. For example, training application 110 can apply a classification model to the first parse thicket and the second parse thicket. The classification model then outputs any common components between the first and second parse thickets.

Returning to FIG. 16, at block 1606, process 1600 involves creating a generalized fragment. At block 1606, training application 110 maintains common components identified at block 1605.

At block 1607, process 1600 involves adding the generalized fragment of text to a training set such as training data 120. Process 1600 can continue until a sufficient number of training samples have been gathered. Training application 110 can also add the first body of text and/or the second body of text to the training data set.

Using Parse Thickets to Determine a Correct Answer

Linguistic generalization using parse thickets can have additional applications beyond extending a training data set. For example, generalization can be used to determine similarity between a question and an answer. Use cases include searching. The following example is presented for illustrative purposes, as also illustrated by FIGS. 17-19.

Figure 17:
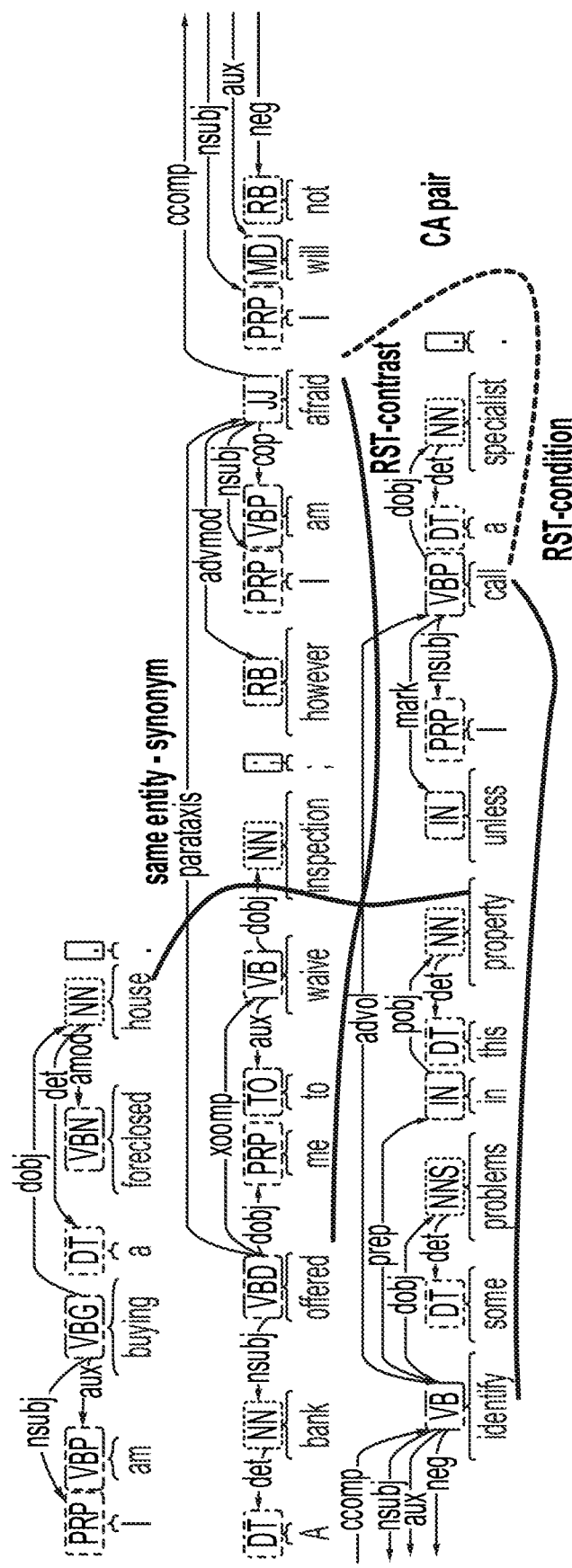
FIG. 17 illustrates a parse thicket for a question, in accordance with an aspect.

FIG. 17 illustrates a parse thicket for a question, in accordance with an aspect. FIG. 17 depicts parse tree 1700, which represents the following question:

Q: I am buying a foreclosed house. A bank offered me to waive inspection; however I am afraid I will not identify some problems in this property unless I call a specialist.

Figure 18:
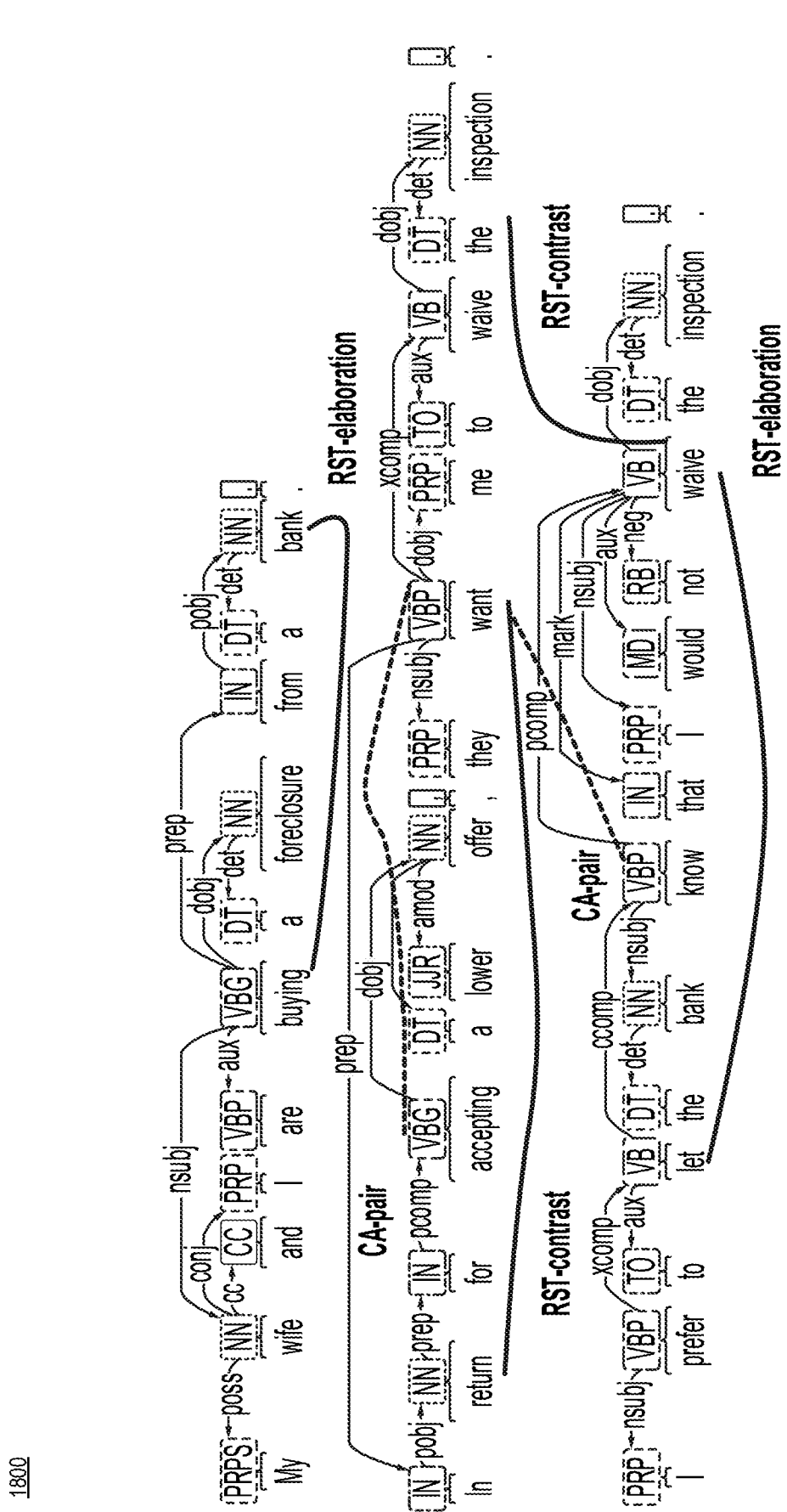
FIG. 18 illustrates a parse thicket for a valid answer, in accordance with an aspect.
Figure 19:
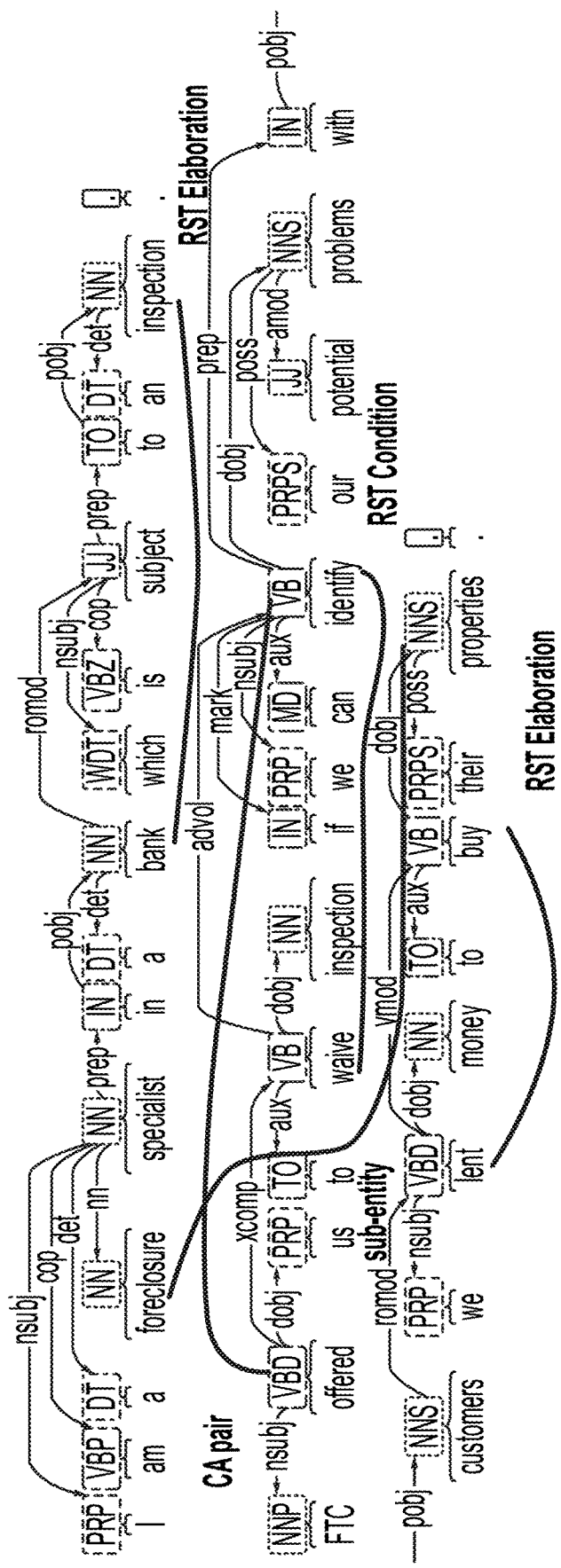
FIG. 19 illustrates a parse thicket for an invalid answer, in accordance with an aspect.

FIG. 18 illustrates a parse thicket for a valid answer, in accordance with an aspect. From the question, a search query is generated and submitted to a search engine. The search engine outputs answer A1. FIG. 18 depicts parse thicket 1800, which represents answer A1. Answer A1 is:

"My wife and I are buying a foreclosure from a bank. In return for accepting a lower offer, they want me to waive the inspection. I prefer to let the bank know that I would not waive the inspection . . . . Instead I would agree that I would pay the costs involved for a proper and thorough home inspection . . . ."

FIG. 19 illustrates a parse thicket for an invalid answer, in accordance with an aspect. FIG. 19 depicts parse thicket 1900. Parse thicket 1900 represents answer A2, which is obtained from the same search as answer A1. Answer A2 reads:

"I am a foreclosure specialist in a bank which is subject to an inspection. FTC offered us to waive inspection if we can identify our potential problems with customers we lent money to buy their properties."

As can be seen, although both answers A1 and A2 share very similar keywords, A2 is totally irrelevant while A1 is relevant. The list of common keywords provides a hint that both documents are about a relationship between the same entities, a house, a buyer and a bank in connection to a foreclosure and an inspection. But keyword statistics and n-gram analysis are insufficient to determine a correspondence of the structure of the relations between A1 and Q, and A2 and Q.

But by using parse thicket representation and syntactic generalization with query Q, answer differentiation is possible. The relations between these entities in A1 and A2 are totally different. Consider the following text: buy, foreclosure, house, bank, wave, inspection.

One can see that the key for the right answer here is rhetorical (RST) relation of contrast: bank wants the inspection waved but the buyer does not. Parse thicket generalization gives the detailed similarity picture that looks more complete than both the bag-of-words approach and pair-wise sentence generalization would. The similarity between Q and A1 is expressed as a parse thicket expressed here as a list of phrases.

[[NP [DT-a NN-bank], NP [NNS-problems], NP [NN*-property], NP [PRP-i]], VP [VB-* TO-to NN-inspection], VP [NN-bank VB-offered PRP-* TO-to VB-waive NN-inspection], VP [VB-* VB-identify NNS-problems IN-* NN*-property], VP [VB-* {phrStr=[ ], roles=[A, *, *], phrDescr=[ ] } DT-a NN-*]]]

Similarity with the invalid answer A2 is expressed as a parse thicket formed as a list of phrases. [[NP [DT-a NN-bank], NP [PRP-i]], [VP [VB-* VB-buying DT-a], VP [VB-* PRP-me TO-to VB-waive NN-inspection], VP [VB-* {phrStr=[ ], roles=[ ], phrDescr=[ ]} PRP-i MD-* RB-not VB-* DT-* NN*-*].

The important phrases of the Q^A1 similarity are VP [NN-bank VB-offered PRP-* TO-to VB-waive NN-inspection], VP [VB-* VB-identify NNS-problems IN-* NN*-property], which can be interpreted as a key topic of both Q and A1: bank and not another entity should offer to waive inspection. This is what differentiates A1 from A2 (where these phrases are absent). Although bank and problems do not occur in the same sentences in Q and A1, they were linked by anaphora and RST relations. Without any kind of discourse analysis, it would be hard to verify whether the phrases containing bank and problems are related to each other. Notice that in A2, problems are associated with customers, not banks, and different rhetoric relations from those common between Q and A1 help us figure that out. Notice the semantic role attributes for verbs such as VB-* {phrStr=[ ], roles=[A, *, *], phrDescr=[ ] } in generalization result.

The similarity in discourse structure of Q, A1 and not in A2: the RST-contrast arc. Also, there is a link for a pair of communicative actions for Q, A1 (it is absent in A2): afraid-call and accept-want.

Hierarchical Labeling

Given input hierarchy data 102, training application 110 can appropriately label the generalized text obtained via process 1600. In some cases, the input hierarchy data 102 can be generated text that includes user requests, wishes, thoughts and concerns in a certain column.

Input hierarchy data 102 can include domain-specific classes. An example is provided below that relates to the home-appliances domain. In an example, training application 110 identifies a four-level hierarchical system with the following categories:

(0) categories (Kitchen).
    (1) sub-categories (Country kitchen).
    (2) instances of sub-category (Entry & country kitchen #eat-in country kitchen #a remodeled country kitchen).
    (3) further categories as described in FIG. 20.

FIG. 20 illustrates example hierarchies, in accordance with an aspect. FIG. 20 depicts categories 2000, which includes first level labels 2001, second level labels 2002, and third level labels 2003. Zero-level labels are omitted from categories 2000.

Head-nouns can be used to match training data or generalized data with input hierarchy data 102. In an example, training application 110 identifies a head noun. The head noun can include an entity (e.g., "countertop."). The training application 110 matches the head noun to a class (e.g., "kitchen."). The training application 110 can then identify an additional head noun phrase from a second fragment (e.g., "remodeled country kitchen,") and match the additional head noun phrase to an additional class (e.g., "country kitchen"). The training application 110 determines that the class and the additional class form a hierarchy, e.g., are related to each other as described in the categories above, and then provides the fragment and additional fragment to the training data set.

Filtering

A phrase can be an explicitly prohibited phrase by manual labeling. Training application 110 can remove one or more words or phrases from the generalized text. Training application 110 therefore can include only the modified generalized text in training data 120.

For example, training application 110 can remove parts of speech or phrases that are not noun or verbs. In another case, training application 110 can filter words or phrases that infer sentiment as to remove opinion. In another example, training application 110 can remove name entities. In some cases, training application 110 maintains name entities that relate to phrases such as "proximity to" and "view of" In some cases, training application 110 can exclude numbers and prepositions. In some cases, training application 110 can limit phrases that a certain length. For example, training application 110 can exclude generalized text that is one word long or is greater than a length threshold. In other cases, training application 110 removes phrases that start with an article and are below a size threshold. In other cases, training application 110 can "clean" the text by removing words that are not in a default language (e.g., English) and/or converting words into a normal form.

Standardization

A list of originally extracted topics can be maintained. The list can be standardized to obtain an aggregated form. For example, head noun extraction can be used for standardization. If two phrases have the same head noun, they are combined into a category. If two phrases within a category have other nouns or adjectives in common besides the head noun, a subcategory is formed from these common nouns or adjectives. In this respect, the cognitive procedure of induction is followed, which finds a commonality between data samples.

For every pair of phrases in out resultant set of subcategories, training application 110 performs one or more of: normalizing each word, merging the words, applying stemming (Porter stemming), normalizing plural to single for nouns, converting verbs to present tense for verbs, and tokenizing (an example of tokenizing is using Lucene library). The following example is illustrative. Consider a hierarchical four-level system with the following categories:
    (0) categories (credit card).
    (1) sub-categories (secured credit card).
    (2) instances of sub-category (apply for secured credit card I secured credit card is denied I cancel secured credit card).
    (3) instances of a sub-sub-category (cancel secured credit card due to delay in payment, deny secured credit card application because of low income, accept secured credit card application very quickly).

Experimental Results

In this section we briefly enumerate a number of tasks and the results for original and extended dataset. We do not provide details of the datasets and evaluation problems and settings but only show the contribution of dataset expansion. It will give a clue on how dataset expansion with the focus of generalization helps in solving problems requiring rich semantic representation.

One can observe a 1-4% improvement in F1 for the typical cases (shown in bold) and 4-7% improvement for the tail cases when the dataset is expanded by the paragraph-level generalization. For some domains transition from sentence to paragraph-level generalization is beneficial.

Our conclusion is that generalization operation on the training set multiplies tail cases, makes it more balanced, and eliminates noisy samples which cannot be generalized, and the same learning algorithm delivers higher accuracy.

TABLE 1

Recognition F-measure of typical and tail cases given original and expanded datasets.

| Problem | Original Dataset | Expansion with sentence-level generalization | Expansion with paragraph-level generalization |
| --- | --- | --- | --- |
| Searching complex, multi-sentence queries | 79.1/67.2 | 83.6/69.3 | 86.4/74.2 |
| Dialogue management | 67.4/60.2 | 69.0/64.1 | 72.7/65.8 |
| Document style recognition | 88.3/80.4 | 89.3/83.9 | 89.2/84.0 |
| Argumentation detection | 78.3/70.2 | 79.2/74.4 | 82.2/77.3 |

Figure 21:
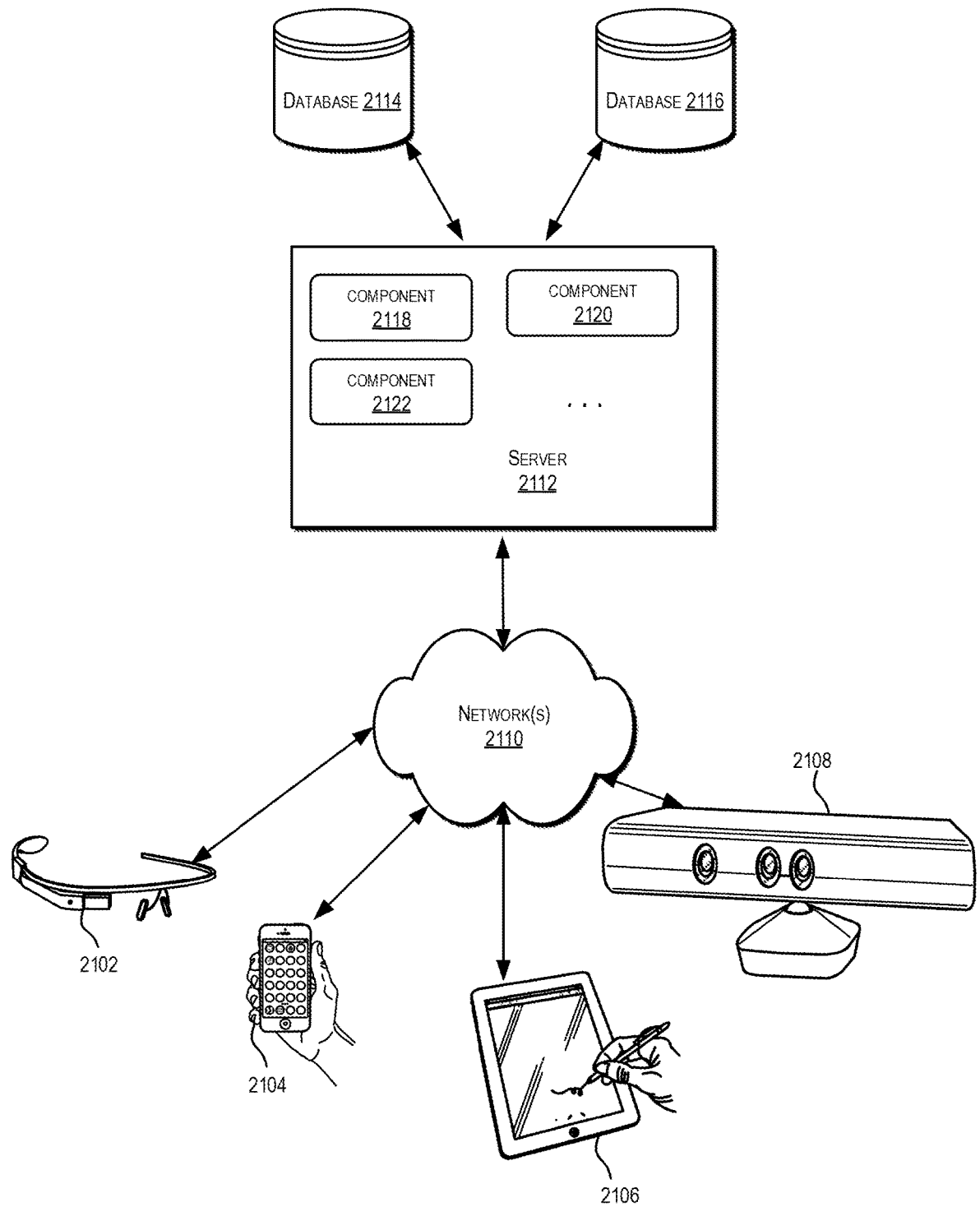
FIG. 21 depicts a simplified diagram of a distributed system for implementing one of the aspects.

FIG. 21 depicts a simplified diagram of a distributed system 2100 for implementing one of the aspects. In the illustrated aspect, distributed system 2100 includes one or more client computing devices 2102, 2104, 2106, and 2108, which are configured to execute and operate a client application such as a web browser, proprietary client (e.g., Oracle Forms), or the like over one or more network(s) 2110. Server 2112 may be communicatively coupled with remote client computing devices 2102, 2104, 2106, and 2108 via network 2110.

In various aspects, server 2112 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 2102, 2104, 2106, and/or 2108. Users operating client computing devices 2102, 2104, 2106, and/or 2108 may in turn utilize one or more client applications to interact with server 2112 to utilize the services provided by these components.

In the configuration depicted in the figure, the software components 2118, 2120 and 2122 of system 2100 are shown as being implemented on server 2112. In other aspects, one or more of the components of system 2100 and/or the services provided by these components may also be implemented by one or more of the client computing devices 2102, 2104, 2106, and/or 2108. Users operating the client computing devices may then utilize one or more client applications to use the services provided by these components. These components may be implemented in hardware, firmware, software, or combinations thereof. It should be appreciated that various different system configurations are possible, which may be different from distributed system 2100. The aspect shown in the figure is thus one example of a distributed system for implementing an aspect system and is not intended to be limiting.

Client computing devices 2102, 2104, 2106, and/or 2108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 2102, 2104, 2106, and 2108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2110.

Although exemplary distributed system 2100 is shown with four client computing devices, any number of client computing devices may be supported. Other devices, such as devices with sensors, etc., may interact with server 2112.

Network(s) 2110 in distributed system 2100 may be any type of network familiar to those skilled in the art that can support data communications using any of a variety of commercially-available protocols, including without limitation TCP/IP (transmission control protocolantemet protocol), SNA (systems network architecture), IPX (Internet packet exchange), AppleTalk, and the like. Merely by way of example, network(s) 2110 can be a local area network (LAN), such as one based on Ethernet, Token-Ring and/or the like. Network(s) 2110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.21 suite of protocols, Bluetooth®, and/or any other wireless protocol); and/or any combination of these and/or other networks.

Server 2112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2112 can include one or more virtual machines running virtual operating systems, or other computing architectures involving virtualization. One or more flexible pools of logical storage devices can be virtualized to maintain virtual storage devices for the server. Virtual networks can be controlled by server 2112 using software defined networking. In various aspects, server 2112 may be adapted to run one or more services or software applications described in the foregoing disclosure. For example, server 2112 may correspond to a server for performing processing described above according to an aspect of the present disclosure.

Server 2112 may run an operating system including any of those discussed above, as well as any commercially available server operating system. Server 2112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2112 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2112 may also include one or more applications to display the data feeds and/or real-time events via one or more display devices of client computing devices 2102, 2104, 2106, and 2108.

Distributed system 2100 may also include one or more databases 2114 and 2116. Databases 2114 and 2116 may reside in a variety of locations. By way of example, one or more of databases 2114 and 2116 may reside on a non-transitory storage medium local to (and/or resident in) server 2112. Alternatively, databases 2114 and 2116 may be remote from server 2112 and in communication with server 2112 via a network-based or dedicated connection. In one set of aspects, databases 2114 and 2116 may reside in a storage-area network (SAN). Similarly, any necessary files for performing the functions attributed to server 2112 may be stored locally on server 2112 and/or remotely, as appropriate. In one set of aspects, databases 2114 and 2116 may include relational databases, such as databases provided by Oracle, that are adapted to store, update, and retrieve data in response to SQL-formatted commands.

Figure 22:
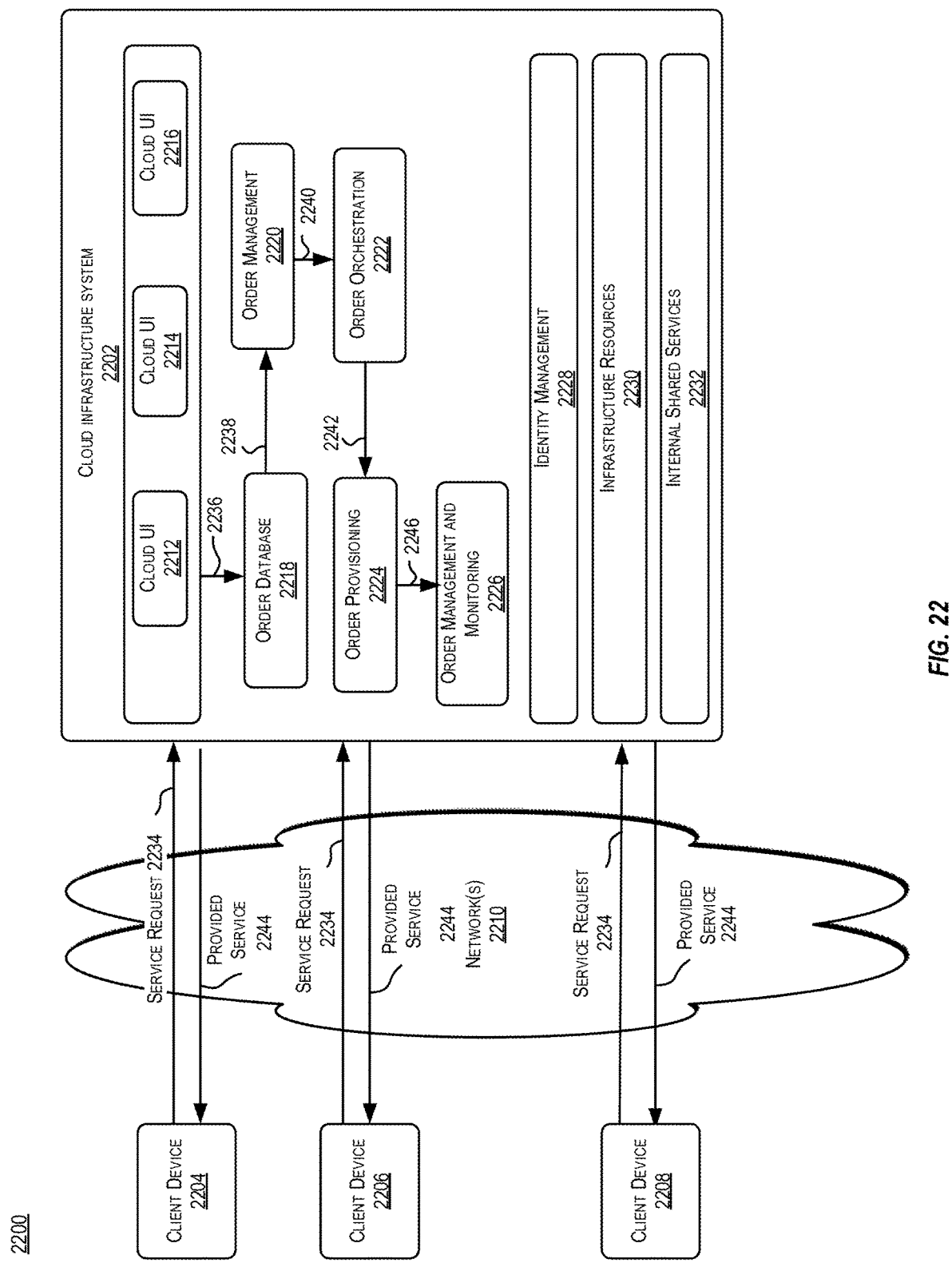
FIG. 22 is a simplified block diagram of components of a system environment by which services provided by the components of an aspect system may be offered as cloud services in accordance with an aspect.

FIG. 22 is a simplified block diagram of one or more components of a system environment 2200 by which services provided by one or more components of an aspect system may be offered as cloud services, in accordance with an aspect of the present disclosure. In the illustrated aspect, system environment 2200 includes one or more client computing devices 2204, 2206, and 2208 that may be used by users to interact with a cloud infrastructure system 2202 that provides cloud services. The client computing devices may be configured to operate a client application such as a web browser, a proprietary client application (e.g., Oracle Forms), or some other application, which may be used by a user of the client computing device to interact with cloud infrastructure system 2202 to use services provided by cloud infrastructure system 2202.

It should be appreciated that cloud infrastructure system 2202 depicted in the figure may have other components than those depicted. Further, the aspect shown in the figure is only one example of a cloud infrastructure system that may incorporate an aspect of the invention. In some other aspects, cloud infrastructure system 2202 may have more or fewer components than shown in the figure, may combine two or more components, or may have a different configuration or arrangement of components.

Client computing devices 2204, 2206, and 2208 may be devices similar to those described above for 2802, 2804, 2806, and 2808.

Although exemplary system environment 2200 is shown with three client computing devices, any number of client computing devices may be supported. Other devices such as devices with sensors, etc. may interact with cloud infrastructure system 2202.

Network(s) 2210 may facilitate communications and exchange of data between clients 2204, 2206, and 2208 and cloud infrastructure system 2202. Each network may be any type of network familiar to those skilled in the art that can support data communications using any of a variety of commercially-available protocols, including those described above for network(s) 2210.

Cloud infrastructure system 2202 may comprise one or more computers and/or servers that may include those described above for server 2112.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 2202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 2202 may be adapted to automatically provision, manage and track a customer's subscription to services offered by cloud infrastructure system 2202. Cloud infrastructure system 2202 may provide the cloud services via different deployment models. For example, services may be provided under a public cloud model in which cloud infrastructure system 2202 is owned by an organization selling cloud services (e.g., owned by Oracle) and the services are made available to the general public or different industry enterprises. As another example, services may be provided under a private cloud, model in which cloud infrastructure system 2202 is operated solely for a single organization and may provide services for one or more entities within the organization. The cloud services may also be provided under a community cloud model in which cloud infrastructure system 2202 and the services provided by cloud infrastructure system 2202 are shared by several organizations in a related community. The cloud services may also be provided under a hybrid cloud model, which is a combination of two or more different models.

In some aspects, the services provided by cloud infrastructure system 2202 may include one or more services provided under Software as a Service (SaaS) category, Platform as a Service (PaSS) category, Infrastructure as a Service (IaaS) category, or other categories of services including hybrid services. A customer, via a subscription order, may order one or more services provided by cloud infrastructure system 2202. Cloud infrastructure system 2202 then performs processing to provide the services in the customer's subscription order.

In some aspects, the services provided by cloud infrastructure system 2202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 2202 may also include infrastructure resources 2230 for providing the resources used to provide various services to customers of the cloud infrastructure system. In one aspect, infrastructure resources 2230 may include pre-integrated and optimized combinations of hardware, such as servers, storage, and networking resources to execute the services provided by the PaaS platform and the SaaS platform.

In some aspects, resources in cloud infrastructure system 2202 may be shared by multiple users and dynamically re-allocated per demand. Additionally, resources may be allocated to users in different time zones. For example, cloud infrastructure system 2230 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 2232 may be provided that are shared by different components or modules of cloud infrastructure system 2202 and by the services provided by cloud infrastructure system 2202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 2202 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 2202, and the like.

In one aspect, as depicted in the figure, cloud management functionality may be provided by one or more modules, such as an order management module 2220, an order orchestration module 2222, an order provisioning module 2224, an order management and monitoring module 2226, and an identity management module 2228. These modules may include or be provided using one or more computers and/or servers, which may be general purpose computers, specialized server computers, server farms, server clusters, or any other appropriate arrangement and/or combination.

In exemplary operation 2234, a customer using a client device, such as client device 2204, 2206 or 2208, may interact with cloud infrastructure system 2202 by requesting one or more services provided by cloud infrastructure system 2202 and placing an order for a subscription for one or more services offered by cloud infrastructure system 2202. In certain aspects, the customer may access a cloud User Interface (UI), cloud UI 2222, cloud UI 2214 and/or cloud UI 2216 and place a subscription order via these UIs. The order information received by cloud infrastructure system 2202 in response to the customer placing an order may include information identifying the customer and one or more services offered by the cloud infrastructure system 2202 that the customer intends to subscribe to.

After an order has been placed by the customer, the order information is received via the cloud UIs, 2222, 2214 and/or 2216.

At operation 2236, the order is stored in order database 2218. Order database 2218 can be one of several databases operated by cloud infrastructure system 2218 and operated in conjunction with other system elements.

At operation 2238, the order information is forwarded to an order management module 2220. In some instances, order management module 2220 may be configured to perform billing and accounting functions related to the order, such as verifying the order, and upon verification, booking the order.

At operation 2240, information regarding the order is communicated to an order orchestration module 2222. Order orchestration module 2222 may utilize the order information to orchestrate the provisioning of services and resources for the order placed by the customer. In some instances, order orchestration module 2222 may orchestrate the provisioning of resources to support the subscribed services using the services of order provisioning module 2224.

In certain aspects, order orchestration module 2222 enables the management of business processes associated with each order and applies business logic to determine whether an order should proceed to provisioning. At operation 2242, upon receiving an order for a new subscription, order orchestration module 2222 sends a request to order provisioning module 2224 to allocate resources and configure those resources needed to fulfill the subscription order. Order provisioning module 2224 enables the allocation of resources for the services ordered by the customer. Order provisioning module 2224 provides a level of abstraction between the cloud services provided by cloud infrastructure system 2200 and the physical implementation layer that is used to provision the resources for providing the requested services. Order orchestration module 2222 may thus be isolated from implementation details, such as whether or not services and resources are actually provisioned on the fly or pre-provisioned and only allocated/assigned upon request.

At operation 2244, once the services and resources are provisioned, a notification of the provided service may be sent to customers on client devices 2204, 2206 and/or 2208 by order provisioning module 2224 of cloud infrastructure system 2202.

At operation 2246, the customer's subscription order may be managed and tracked by an order management and monitoring module 2226. In some instances, order management and monitoring module 2226 may be configured to collect usage statistics for the services in the subscription order, such as the amount of storage used, the amount data transferred, the number of users, and the amount of system up time and system down time.

In certain aspects, cloud infrastructure system 2200 may include an identity management module 2228. Identity management module 2228 may be configured to provide identity services, such as access management and authorization services in cloud infrastructure system 2200. In some aspects, identity management module 2228 may control information about customers who wish to utilize the services provided by cloud infrastructure system 2202. Such information can include information that authenticates the identities of such customers and information that describes which actions those customers are authorized to perform relative to various system resources (e.g., files, directories, applications, communication ports, memory segments, etc.) Identity management module 2228 may also include the management of descriptive information about each customer and about how and by whom that descriptive information can be accessed and modified.

Figure 23:
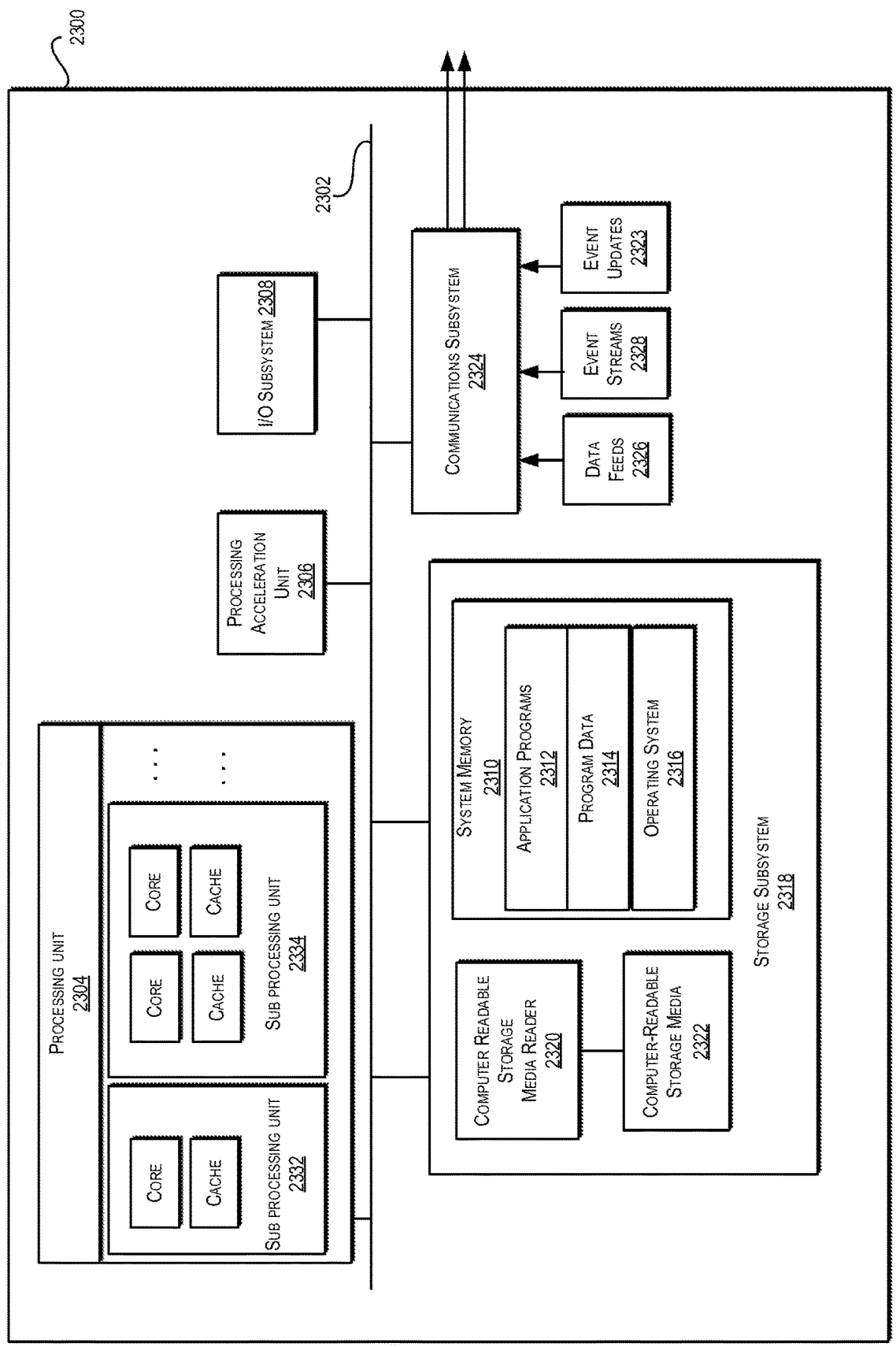
FIG. 23 illustrates an exemplary computer system, in which various aspects of the present invention may be implemented.

FIG. 23 illustrates an exemplary computer system 2300, in which various aspects of the present invention may be implemented. The system 2300 may be used to implement any of the computer systems described above. As shown in the figure, computer system 2300 includes a processing unit 2304 that communicates with a number of peripheral subsystems via a bus subsystem 2302. These peripheral subsystems may include a processing acceleration unit 2306, an I/O subsystem 2308, a storage subsystem 2318 and a communications subsystem 2324. Storage subsystem 2318 includes tangible computer-readable storage media 2322 and a system memory 2310.

Bus subsystem 2302 provides a mechanism for letting the various components and subsystems of computer system 2300 communicate with each other as intended. Although bus subsystem 2302 is shown schematically as a single bus, alternative aspects of the bus subsystem may utilize multiple buses. Bus subsystem 2302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P2386.1 standard.

Processing unit 2304, which can be implemented as one or more integrated circuits (e.g., a conventional microprocessor or microcontroller), controls the operation of computer system 2300. One or more processors may be included in processing unit 2304. These processors may include single core or multicore processors. In certain aspects, processing unit 2304 may be implemented as one or more independent processing units 2332 and/or 2334 with single or multicore processors included in each processing unit. In other aspects, processing unit 2304 may also be implemented as a quad-core processing unit formed by integrating two dual-core processors into a single chip.

In various aspects, processing unit 2304 can execute a variety of programs in response to program code and can maintain multiple concurrently executing programs or processes. At any given time, some or all of the program code to be executed can be resident in processor(s) 2304 and/or in storage subsystem 2318. Through suitable programming, processor(s) 2304 can provide various functionalities described above. Computer system 2300 may additionally include a processing acceleration unit 2306, which can include a digital signal processor (DSP), a special-purpose processor, and/or the like.

I/O subsystem 2308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2300 may comprise a storage subsystem 2318 that comprises software elements, shown as being currently located within a system memory 2310. System memory 2310 may store program instructions that are loadable and executable on processing unit 2304, as well as data generated during the execution of these programs.

Depending on the configuration and type of computer system 2300, system memory 2310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2304. In some implementations, system memory 2310 may include multiple different types of memory, such as static random access memory (SRAM) or dynamic random access memory (DRAM). In some implementations, a basic input/output system (BIOS), containing the basic routines that help to transfer information between elements within computer system 2300, such as during start-up, may typically be stored in the ROM. By way of example, and not limitation, system memory 2310 also illustrates application programs 2312, which may include client applications, Web browsers, mid-tier applications, relational database management systems (RDBMS), etc., program data 2314, and an operating system 2316. By way of example, operating system 2316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2318 may also provide a tangible computer-readable storage medium for storing the basic programming and data constructs that provide the functionality of some aspects. Software (programs, code modules, instructions) that when executed by a processor provide the functionality described above may be stored in storage subsystem 2318. These software modules or instructions may be executed by processing unit 2304. Storage subsystem 2318 may also provide a repository for storing data used in accordance with the present invention.

Storage subsystem 2300 may also include a computer-readable storage media reader 2320 that can further be connected to computer-readable storage media 2322. Together and, optionally, in combination with system memory 2310, computer-readable storage media 2322 may comprehensively represent remote, local, fixed, and/or removable storage devices plus storage media for temporarily and/or more permanently containing, storing, transmitting, and retrieving computer-readable information.

Computer-readable storage media 2322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 2300.

By way of example, computer-readable storage media 2322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2322 may include, but is not limited to, Zip® drives, flash memory cards, universal serial bus (USB) flash drives, secure digital (SD) cards, DVD disks, digital video tape, and the like. Computer-readable storage media 2322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2300.

Communications subsystem 2324 provides an interface to other computer systems and networks. Communications subsystem 2324 serves as an interface for receiving data from and transmitting data to other systems from computer system 2300. For example, communications subsystem 2324 may enable computer system 2300 to connect to one or more devices via the Internet. In some aspects, communications subsystem 2324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 2324 can provide wired network connectivity (e.g., Ethernet) in addition to or instead of a wireless interface.

In some aspects, communications subsystem 2324 may also receive input communication in the form of structured and/or unstructured data feeds 2326, event streams 2328, event updates 2323, and the like on behalf of one or more users who may use computer system 2300.

By way of example, communications subsystem 2324 may be configured to receive, unstructured data feeds 2326 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 2324 may also be configured to receive data in the form of continuous data streams, which may include event streams 2328 of real-time events and/or event updates 2323, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2324 may also be configured to output the structured and/or unstructured data feeds 2326, event streams 2328, event updates 2323, and the like to one or more databases that may be in communication with one or more streaming data source computers coupled to computer system 2300.

Computer system 2300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method for extending a training data set for a classification model, the method comprising:
  constructing, for a first body of text comprising fragments, a first syntactic tree and a first discourse tree;
  constructing, for a second body of text comprising fragments, a second syntactic tree and a second discourse tree, each discourse tree comprising terminal nodes and nonterminal nodes, wherein each terminal node is associated with one of the fragments of the respective body of text and each nonterminal node represents a rhetorical relationship between two of the fragments;
  merging the first syntactic tree and the first discourse tree into a first parse thicket;

merging the second syntactic tree and the second discourse tree into a second parse thicket, wherein each parse thicket identifies one or more of the following: (i) two nouns in a different fragment represented by the respective syntactic trees, wherein each noun represents a common entity, or (ii) an additional rhetorical relation between fragments represented by the respective discourse trees;

identifying, between the first parse thicket and the second parse thicket, one or more common components, wherein the one or more common components include one or more of (i) a common part of speech, (ii) a common communicative action, (iii) a common rhetorical relation, or (iv) a common verb signature;

creating a generalized fragment comprising text that is associated with the one or more common components; and adding the generalized fragment to a training data set.

2. The method of claim 1, further comprising training the classification model with the training data set.

3. The method of claim 1, further comprising adding the first body of text and the second body of text to the training data set.

4. The method of claim 1, further comprising identifying that a first domain-specific class from the first parse thicket matches a second-domain specific class from the second parse thicket.

5. The method of claim 1, further comprising:
accessing a corpus of text;
parsing the corpus of text into a plurality of additional fragments; and
selecting, from the plurality of additional fragments, the first body of text and the second body of text.

6. The method of claim 1, further comprising translating the generalized fragment into a complete sentence.

7. The method of claim 1, wherein the identifying comprises applying the classification model to the first parse thicket and the second parse thicket and obtaining, from the classification model, the one or more common components.

8. The method of claim 1, further comprising filtering the generalized fragment based on sentiment, type of phrase, or length of phrase.

9. The method of claim 1, further comprising:
identifying, from the generalized fragment, a head noun phrase comprising an entity;
matching, in a predefined list, the head noun phrase to a class;
accessing an additional fragment;
identifying, from the additional fragment, an additional head noun phrase;
matching, in the predefined list, the additional head noun phrase to an additional class;
determining that the class and the additional class form a hierarchy; and
providing the class, the additional fragment, and the additional class to the training data set.

10. The method of claim 1, wherein the first body of text represents a first sentence and the second body of text represents a second sentence.

11. The method of claim 1, wherein the first body of text represents a first paragraph and the second body of text represents a second paragraph, and wherein the first parse thicket comprises a first set of additional syntactic trees and the second parse thicket comprises a second set of additional syntactic trees.

12. A system comprising:
a non-transitory computer-readable medium storing computer-executable program instructions; and
a processing device communicatively coupled to the non-transitory computer-readable medium for executing the computer-executable program instructions, wherein executing the computer-executable program instructions configures the processing device to perform operations comprising:
constructing, for a first body of text comprising fragments, a first syntactic tree and a first discourse tree;
constructing, for a second body of text comprising fragments, a second syntactic tree and a second discourse tree, each discourse tree comprising terminal nodes and nonterminal nodes, wherein each terminal node is associated with one of the fragments of the respective body of text and each nonterminal node represents a rhetorical relationship between two of the fragments;
merging the first syntactic tree and the first discourse tree into a first parse thicket;
merging the second syntactic tree and the second discourse tree into a second parse thicket, wherein each parse thicket identifies one or more of the following: (i) two nouns in a different fragment represented by the respective syntactic trees, wherein each noun represents a common entity, or (ii) an additional rhetorical relation between fragments represented by the respective discourse trees;
identifying, between the first parse thicket and the second parse thicket, one or more common components, wherein the one or more common components include one or more of (i) a common part of speech, (ii) a common communicative action, (iii) a common rhetorical relation, or (iv) a common verb signature;
creating a generalized fragment comprising text that is associated with the one or more common components; and
adding the generalized fragment to a training data set.

13. The system of claim 12, wherein executing the computer-executable program instructions configures the processing device to perform operations comprising training a classification model with the training data set.

14. The system of claim 12, wherein executing the computer-executable program instructions configures the processing device to perform operations comprising identifying that a first domain-specific class from the first parse thicket matches a second-domain specific class from the second parse thicket.

15. The system of claim 12, wherein executing the computer-executable program instructions configures the processing device to perform operations comprising:
accessing a corpus of text;
parsing the corpus of text into a plurality of additional fragments; and
selecting, from the plurality of additional fragments, the first body of text and the second body of text.

16. The system of claim 12, wherein executing the computer-executable program instructions configures the processing device to perform operations comprising:
identifying, from the generalized fragment, a head noun phrase comprising an entity;
matching, in a predefined list, the head noun phrase to a class;
accessing an additional fragment;
identifying, from the additional fragment, an additional head noun phrase;

matching, in the predefined list, the additional head noun phrase to an additional class;

determining that the class and the additional class form a hierarchy; and providing the class, the additional fragment, and the additional class to the training data set.

17. The system of claim 12, wherein the first body of text represents a first sentence and the second body of text represents a second sentence.

18. The system of claim 12, wherein the first body of text represents a first paragraph and the second body of text represents a second paragraph, and wherein the first parse thicket comprises a first set of additional syntactic trees and the second parse thicket comprises a second set of additional syntactic trees.

19. A non-transitory computer-readable storage medium storing computer-executable program instructions, wherein when executed by a processing device, the program instructions cause the processing device to perform operations comprising:

constructing, for a first body of text comprising fragments, a first syntactic tree and a first discourse tree;

constructing, for a second body of text comprising fragments, a second syntactic tree and a second discourse tree, each discourse tree comprising terminal nodes and nonterminal nodes, wherein each terminal node is associated with one of the fragments of the respective body of text and each nonterminal node represents a rhetorical relationship between two of the fragments;

merging the first syntactic tree and the first discourse tree into a first parse thicket;

merging the second syntactic tree and the second discourse tree into a second parse thicket, wherein each parse thicket identifies one or more of the following: (i) two nouns in a different fragment represented by the respective syntactic trees, wherein each noun represents a common entity, or (ii) an additional rhetorical relation between fragments represented by the respective discourse trees;

identifying, between the first parse thicket and the second parse thicket, one or more common components, wherein the one or more common components include one or more of (i) a common part of speech, (ii) a common communicative action, (iii) a common rhetorical relation, or (iv) a common verb signature;

creating a generalized fragment comprising text that is associated with the one or more common components; and adding the generalized fragment to a training data set.

20. The non-transitory computer-readable medium of claim 19, wherein the first body of text represents a first paragraph and the second body of text represents a second paragraph, and wherein the first parse thicket comprises a first set of additional syntactic trees and the second parse thicket comprises a second set of additional syntactic trees.

* * * * *

UNITED STATES PATENT AND TRADEMARK OFFICE
CERTIFICATE OF CORRECTION

| | |
|---|---|
| PATENT NO. | : 11,455,494 B2 |
| APPLICATION NO. | : 16/426878 |
| DATED | : September 27, 2022 |
| INVENTOR(S) | : Boris Galitsky |

It is certified that error appears in the above-identified patent and that said Letters Patent is hereby corrected as shown below:

On the Title Page

On page 3, Column 1, Item (56) under Other Publications, Line 64, delete "lnformation" and insert -- Information --, therefor.

In the Specification

In Column 8, Line 52, delete "History" and insert -- History. --, therefor.

In Column 8, Line 54, delete "attend" and insert -- attend. --, therefor.

In Column 8, Line 56, delete "Hawaii" and insert -- Hawaii. --, therefor.

In Column 14, Line 33, delete "truck"" and insert -- truck." --, therefor.

In Column 19, Line 55, delete "many," and insert -- marry, --, therefor.

In Column 20, Line 59, delete "a an" and insert -- an --, therefor.

In Column 21, Line 55, delete "Of" and insert -- of --, therefor.

In Column 24, Line 31, delete "the a" and insert -- a --, therefor.

In Column 26, Line 28, delete "Any User)," and insert -- AnyUser), --, therefor.

In Column 26, Line 36, delete "Any User)." and insert -- AnyUser). --, therefor.

In Column 29, Line 22, delete "NN-*]]]" and insert -- NN-*]]]. --, therefor.

Signed and Sealed this
Fourteenth Day of March, 2023

Katherine Kelly Vidal
*Director of the United States Patent and Trademark Office*

CERTIFICATE OF CORRECTION (continued)
U.S. Pat. No. 11,455,494 B2

In Column 32, Line 46, delete "protocolantemet" and insert -- protocol/Internet --, therefor.

In Column 35, Line 57, delete "(PaSS)" and insert -- (PaaS) --, therefor.

In Column 42, Line 2, delete "receive," and insert -- receive --, therefor.